United States Patent
Inoue et al.

(10) Patent No.: US 8,296,537 B2
(45) Date of Patent: Oct. 23, 2012

(54) STORAGE SYSTEM AND REMOTE COPY RECOVERY METHOD

(75) Inventors: Shintaro Inoue, Odawara (JP); Katsuhiro Okumoto, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/355,617

(22) Filed: Jan. 23, 2012

(65) Prior Publication Data

US 2012/0144137 A1 Jun. 7, 2012

Related U.S. Application Data

(63) Continuation of application No. 13/177,080, filed on Jul. 6, 2011, now Pat. No. 8,117,411, which is a continuation of application No. 12/194,625, filed on Aug. 20, 2008, now Pat. No. 7,996,637.

(30) Foreign Application Priority Data

Jul. 2, 2008 (JP) .................. 2008-173513

(51) Int. Cl.
*G06F 12/00* (2006.01)

(52) U.S. Cl. ........ 711/162; 711/112; 711/114; 711/203; 707/648; 707/649; 707/658; 707/659; 714/6.2; 714/6.23; 714/6.3

(58) Field of Classification Search .................. 711/162, 711/112, 114, 203; 707/648, 649, 658, 659; 714/6.2, 6.23, 6.3
See application file for complete search history.

(56) References Cited

U.S. PATENT DOCUMENTS

| | | |
|---|---|---|
| 6,237,008 B1 | 5/2001 | Beal et al. |
| 7,082,506 B2 | 7/2006 | Nakano et al. |
| 7,237,078 B2 | 6/2007 | Hiraiwa et al. |
| 7,409,507 B2 | 8/2008 | Serizawa |
| 7,461,224 B2 | 12/2008 | Kawamura et al. |
| 7,587,466 B2 | 9/2009 | Yamada et al. |
| 7,865,678 B2 | 1/2011 | Arakawa et al. |
| 2003/0051111 A1 | 3/2003 | Nakano et al. |
| 2003/0188233 A1 | 10/2003 | Lubbers et al. |
| 2004/0024975 A1 | 2/2004 | Morishita et al. |
| 2004/0230859 A1 | 11/2004 | Cochran et al. |
| 2005/0033828 A1 | 2/2005 | Watanabe |

(Continued)

FOREIGN PATENT DOCUMENTS

EP 1283469 A 2/2003

(Continued)

OTHER PUBLICATIONS

European Search Report dated Jun. 23, 2009 for European Patent Application No. 09 25 0028.

*Primary Examiner* — Stephen Elmore
(74) *Attorney, Agent, or Firm* — Mattingly & Malur, PC

(57) ABSTRACT

The storage system includes a first storage device, configured to be installed in a first site and providing a primary logical volume in which data received from a host computer is written; a second storage device, configured to be installed in a second site and providing a virtual logical volume, which has no structure for storing data received from the first storage system; and a third storage device, configured to be installed in a third site and providing a secondary logical volume in which data received from the second storage system is written. Data written in the primary logical volume of the first storage device are remote-copied to the secondary logical volume of the third storage device via the virtual logical volume of the second storage device.

17 Claims, 34 Drawing Sheets

U.S. PATENT DOCUMENTS

| | | |
|---|---|---|
| 2005/0052921 A1 | 3/2005 | Butterworth et al. |
| 2005/0071710 A1 | 3/2005 | Micka et al. |
| 2005/0081091 A1 | 4/2005 | Bartfai et al. |
| 2005/0114410 A1 | 5/2005 | Fujibayashi |
| 2005/0223267 A1 | 10/2005 | Fujibayashi |
| 2005/0228957 A1 | 10/2005 | Satoyama et al. |
| 2005/0235121 A1 | 10/2005 | Ito et al. |
| 2008/0098188 A1 | 4/2008 | Ito et al. |
| 2009/0006794 A1 | 1/2009 | Mizuta et al. |

FOREIGN PATENT DOCUMENTS

| | | |
|---|---|---|
| EP | 1591899 A | 11/2005 |
| EP | 1647891 | 4/2006 |
| JP | 10049418 A | 2/1998 |
| JP | 2003-122509 A | 4/2003 |
| JP | 2005-301590 A | 10/2005 |
| JP | 2005-309550 | 11/2005 |
| WO | 0049500 A | 8/2000 |
| WO | 02/17056 | 2/2002 |
| WO | 2004017194 A2 | 2/2004 |
| WO | 2008028803 A | 3/2008 |

FIG. 3
30

| LOGICAL VOLUME NUMBER | VOLUME STATE | PAIR NUMBER |
|---|---|---|
| 1 | NORMAL | 1 |
| 2 | NORMAL | 0 |
| 3 | NORMAL | 1 |
| 4 | NORMAL | 0 |
| 5 | UNUSED | 0 |
| 30A | 30B | 30C |

FIG. 4
31

| PAIR NUMBER | PAIR INFORMATION | INTRA-DEVICE LOGICAL VOLUME NUMBER | OTHER DEVICE NUMBER | OTHER LOGICAL VOLUME NUMBER | VIRTUALIZATION FLAG |
|---|---|---|---|---|---|
| 1 | SYNCHRONIZATION | 1 | 1 | 1 | ON |
| 2 | SYNCHRONIZATION | 1 | 3 | 1 | 0 |
| 3 | UNUSED | 0 | 0 | 0 | 0 |
| 4 | UNUSED | 0 | 0 | 0 | 0 |
| 31A | 31B | 31C | 31D | 31E | 31F |

| JOURNAL GROUP NUMBER | SOURCE VOLUME | JOURNAL VOLUME NUMBER | PATH OBSTACLE DETECTION CHECKING TIME | PATH DISCONNECTION DETECTING TIME |
|---|---|---|---|---|
| 1 | 1 | 3 | 5 [MIN] | YEAR/MONTH/DAY/HOUR/MINUTES |
| 2 | 0 | 0 | 0 | 0 |

| PAIR NUMBER | PAIR INFORMATION | INTRA DEVICE LOGICAL VOLUME NUMBER | OTHER DEVICE NUMBER | OTHER LOGICAL VOLUME NUMBER | VIRTUALIZATION FLAG |
|---|---|---|---|---|---|
| 1 | SYNCHRONIZATION | 1 | 1 | 1 | ON |
| 2 | SYNCHRONIZATION ⇒ OBSTACLE | 1 | 3 | 1 | ON |
| 3 | UNUSED | 0 | 0 | 0 | 0 |
| 4 | UNUSED | 0 | 0 | 0 | 0 |
| 31A | 31B | 31C | 31D | 31E | 31F |

| PAIR NUMBER | PAIR INFORMATION | INTRA DEVICE LOGICAL VOLUME NUMBER | OTHER DEVICE NUMBER | OTHER LOGICAL VOLUME NUMBER | VIRTUALIZATION FLAG |
|---|---|---|---|---|---|
| 1 | SYNCHRONIZATION ⇒ OBSTACLE | 1 | 2 | 1 | ON |
| 2 | UNUSED | 0 | 0 | 0 | 0 |
| 3 | UNUSED | 0 | 0 | 0 | 0 |
| 4 | UNUSED | 0 | 0 | 0 | 0 |
| 31A | 31B | 31C | 31D | 31E | 31F |

| PAIR NUMBER | PAIR INFORMATION | INTRA DEVICE LOGICAL VOLUME NUMBER | OTHER DEVICE NUMBER | OTHER LOGICAL VOLUME NUMBER | VIRTUALIZATION FLAG |
|---|---|---|---|---|---|
| 1 | OBSTACLE | 1 | 1 | 1 | ON |
| 2 | OBSTACLE ⇒ SYNCHRONIZING | 1 | 3 | 1 | ON |
| 3 | UNUSED | 0 | 0 | 0 | 0 |
| 4 | UNUSED | 0 | 0 | 0 | 0 |
| 31A | 31B | 31C | 31D | 31E | 31F |

| PAIR NUMBER | PAIR INFORMATION | INTRA DEVICE LOGICAL VOLUME NUMBER | OTHER DEVICE NUMBER | OTHER LOGICAL VOLUME NUMBER | VIRTUALIZATION FLAG |
|---|---|---|---|---|---|
| 1 | OBSTACLE ⇒ SYNCHRONIZING | 1 | 2 | 1 | ON |
| 2 | UNUSED | 0 | 0 | 0 | 0 |
| 3 | UNUSED | 0 | 0 | 0 | 0 |
| 4 | UNUSED | 0 | 0 | 0 | 0 |
| 31A | 31B | 31C | 31D | 31E | 31F |

| PAIR NUMBER | PAIR INFORMATION | INTRA DEVICE LOGICAL VOLUME NUMBER | OTHER DEVICE NUMBER | OTHER LOGICAL VOLUME NUMBER | VIRTUALIZATION FLAG |
|---|---|---|---|---|---|
| 1 | OBSTACLE ⇒ SYNCHRONIZING | 1 | 2 | 1 | ON |
| 2 | UNUSED | 0 | 0 | 0 | 0 |
| 3 | UNUSED | 0 | 0 | 0 | 0 |
| 4 | UNUSED | 0 | 0 | 0 | 0 |
| 31A | 31B | 31C | 31D | 31E | 31F |

| PAIR NUMBER | PAIR INFORMATION | INTRA DEVICE LOGICAL VOLUME NUMBER | OTHER DEVICE NUMBER | OTHER LOGICAL VOLUME NUMBER | VIRTUALIZATION FLAG |
|---|---|---|---|---|---|
| 1 | OBSTACLE ⇒ SYNCHRONIZING | 1 | 1 | 1 | ON |
| 2 | SYNCHRONIZATION | 1 | 3 | 1 | ON |
| 3 | UNUSED | 0 | 0 | 0 | 0 |
| 4 | UNUSED | 0 | 0 | 0 | 0 |
| 31A | 31B | 31C | 31D | 31E | 31F |

STORAGE SYSTEM AND REMOTE COPY RECOVERY METHOD

CROSS REFERENCES TO RELATED APPLICATIONS

This application is a continuation application of U.S. Ser. No. 13/177,080, filed Jul. 6, 2011 (now U.S. Pat. No. 8,117,411), which is a continuation application of U.S. Ser. No. 12/194,625, filed Aug. 20, 2008 (now U.S. Pat. No. 7,996,637), the entire disclosures of which are hereby incorporated by reference. This application relates to and claims priority from Japanese Patent Application No. JP 2008-173513, filed on Jul. 2, 2008, the entire disclosure of which is incorporated herein by reference.

BACKGROUND OF THE INVENTION

1. Field of the Invention

The present invention relates to a storage system and a remote copy recovery method, for example, is suitable for application to a 3DC (Data Center) system.

2. Description of the Related Art

Conventionally, as countermeasures against natural calamities (disasters recovery) in a storage system, a technique has been known that data written in a primary logical volume of a storage device operated by a certain site is copied to a secondary logical volume of a storage device installed in a site remote from the site for backup (hereinafter, referred to as "remote copy").

In recent, a storage system has been proposed much, which is also called a 3DC system, that data written in a primary logical volume of a first storage device installed in a first site operated is transmitted to a third storage device installed in a third site via a second storage device installed in a second site, and, in the third storage device, the data is copied to a secondary logical volume provided by the third storage device.

For instance, in such 3DC system, a technique is disclosed in the Patent Document 1 that the data as a transmitting object is transmitted to the third storage device without an intermediate site (the second site) holding the data. According to such method, a logical volume with the same capacity as the primary logical volume of the second storage device is not necessary to prepare, and thus there is an advantage to build the 3DC system at a low cost.

[Patent Document 1] JP-A-2005-309550

However, in the 3DC system, when an obstacle occurs in a network for connecting between, for example, the second and the third storage devices, all of the data of remote copying object in the first storage device are transmitted to the third storage device via the second storage device after the corresponding network was recovered from the obstacle. With this, there is a problem in that it takes much time to return the operation of the 3DC system to a normal operation after the network was recovered from the obstacle.

SUMMARY OF THE INVENTION

The present invention is directed to provide a storage system and a remote copy recovery method capable of reducing a recovery time from the obstacle of the remote copy.

The present invention is directed to solve such problems and to provide a storage system including: a first storage device configured to be installed in a first site to provide a first logical volume; a second storage device configured to be installed in a second site; and a third storage device configured to be installed in a third site to provide a second logical volume, wherein data written in the first logical volume of the first storage device are transmitted to the third storage device via the second storage device, the data being written in the same location as the first logical volume within the secondary logical volume in the third storage device; wherein, when transmission of the data stops among the first to the third storage devices, the respective second storage device and the third storage device manage locations in the secondary logical volume where the data held thereby are to be written; and wherein, when transmission of the data resumes among the first to the third storage devices, the locations in the secondary logical volume managed by the respective second and the third storage devices are aggregated, the data to be written in the respective aggregated location in the secondary logical volume being transmitted from the first storage device to the third storage device via the second storage device.

In addition, the present invention provides a remote copy recovery method in a storage system, in which data written in a first logical volume provided by a first storage device are transmitted to a third storage device via a second storage device, the data being written in the same location as the first logical volume within the secondary logical volume in the third storage device, the method including: the first step of managing locations in the secondary logical volume where the data held thereby are to be written, in the respective second storage device and the third storage device, when transmission of the data stops among the first to the third storage devices; and the second step of aggregating the locations in the secondary logical volume respectively managed in the second and the third storage devices and transmitting the data to be written in the respective aggregated location in the secondary logical volume from the first storage device to the third storage device via the second storage device, when transmission of the data resumes among the first to the third storage devices.

According to a storage system and a remote copy recovery method, since just a difference between the first logical volume and the secondary logical volume is copied at the time of transmitting of the data again among the first to the third storage devices, a remote copy can be recovered into a normal state at a very short time, compared with a conventional method of copying all of the data in the first logical volume to the secondary logical volume.

According to the present invention, a storage system and a remote copy recovery system capable of reducing a recovery time very shortly can be realized.

BRIEF DESCRIPTION OF THE DRAWINGS

FIG. 3 is a view to conceptually represent a configuration of the volume information table;

FIG. 4 is a view to conceptually represent a configuration of the pair information table;

FIG. 5 is a view to conceptually represent a configuration of the journal group setting information table;

FIG. 14 is a conceptual view to be provided for description of the synchronization unlocking process in the second storage device;

FIG. 16 is a conceptual view to be provided for description of the synchronization unlocking process in the third storage device;

FIG. 20 is a conceptual view to be provided for description of the resynchronization process performed in the second storage device about resynchronization between the second and the third storage devices;

FIG. 22 is a conceptual view to be provided for description of the resynchronization process performed in the third storage device about resynchronization between the second and the third storage devices;

FIG. 25 is a conceptual view to be provided for description of the resynchronization process performed in the first storage device about resynchronization between the first and the second storage devices;

FIG. 27 is a conceptual view to be provided for description of the resynchronization process performed in the second storage device about resynchronization between the first and the second storage devices;

DESCRIPTION OF THE PREFERRED EMBODIMENTS

Hereinafter, embodiments of the present invention will be described with reference to the accompanying drawings.

(1) Configuration of a Storage System According to the Present Embodiment

Figure 1:
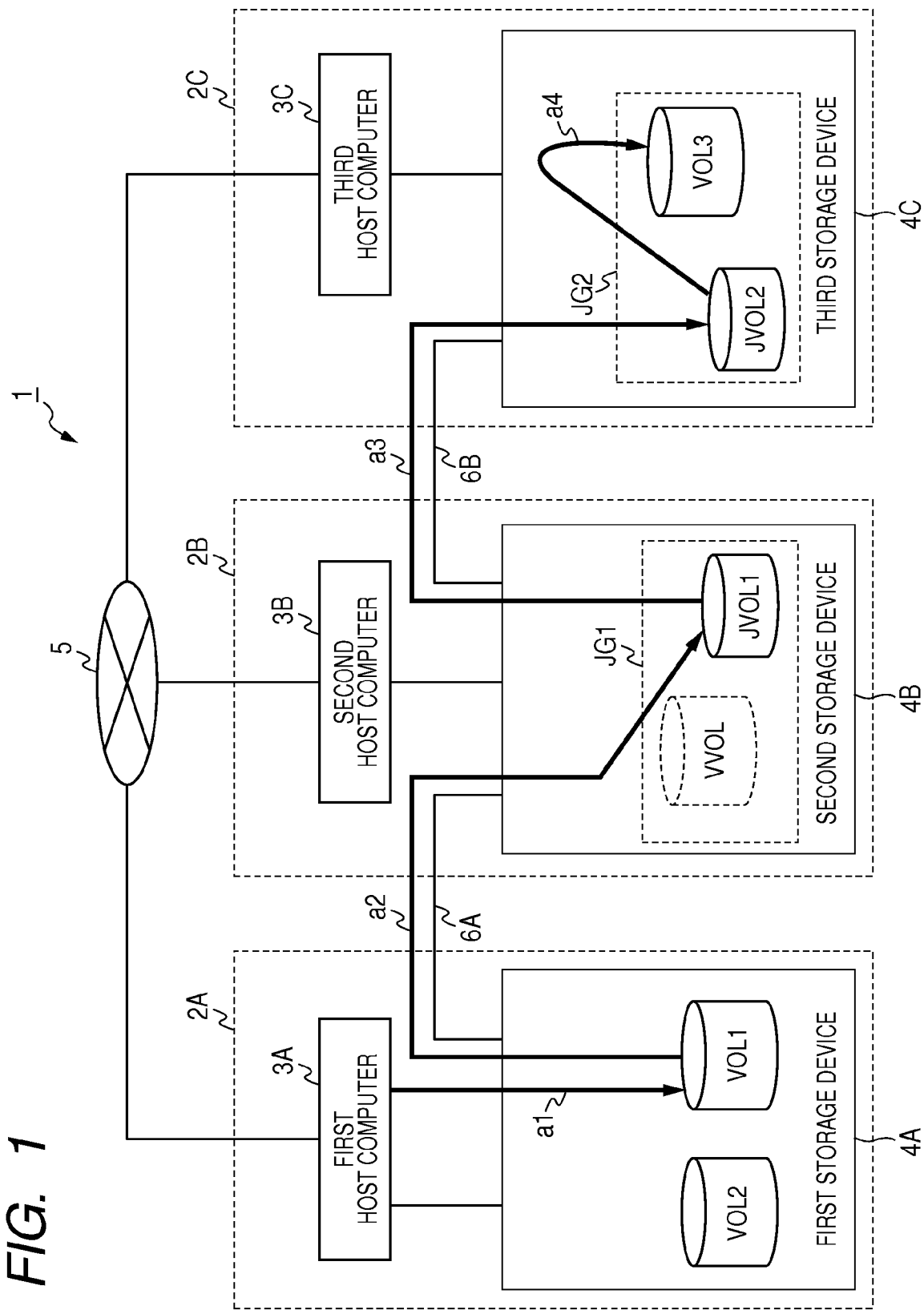
FIG. 1 is a block diagram to represent an entire configuration of a storage system according to the present embodiment.

FIG. 1 shows a storage system 1 according to the present embodiment. The storage system 1 includes a first host computer to a third host computer 3A to 3C and a first storage device to a third storage device 4A to 4C installed in a first site to a third site 2A to 2C, respectively. The first to the third sites 2A to 2C are, for example, computer facilities operated by organizations such as a university, a company or the like, or data centers to operate a Web server on the Internet, an ASP (Application Service Provider), or the like. This storage system 1 is built for a disaster discovery from an earthquake, a fire, a typhoon, a flood, the falling of a thunderbolt, a terror, or the like.

The first host computer 3A and the first storage device 4A are installed in the first site 2A of three sites. The second host computer 3B and the second storage device 4B are installed in the second site 2B, and the third host computer 3C and the third storage device 4C are installed in the third site 2C.

The first host computer 3A and the first storage device 4A installed in the first site 2A are operated for a business, and the third host computer 3C and the third storage device 4C installed in the third site 2C are operated for a backup. In addition, the second host computer 3B and the second storage device 4B installed in the second site 2B are used for an intermediate upon transmission of data between the first and the third storage devices 4A and 4C.

The first to third host computers 3A to 3C installed in the first to the third sites 2A to 2C, respectively, are coupled communicably via a network 5. The network 5 is a WAN (Wide Area Network) configured of an IP (Internet Protocol) network, for example.

The first and the second storage devices 4A and 4B, and the second and the third storage devices 4B and 4C are coupled via a network 6A and a network 6B, respectively. The networks 6A and 6B in this case employ, for example, an ATM (Asynchronous Transfer Mode) or a fiber channel, which has a high speed and a large capacity, in order to transmit copy data at the time of remote copy between the second and the third storage devices 4B and 4C, described later.

The first to the third host computers 3A to 3C are computer devices having hardware resources such as a CPU (Central Processing Unit) and memories, respectively, and, are configured of a personal computer, a workstation, a mainframe, or the like, for example.

Figure 2:
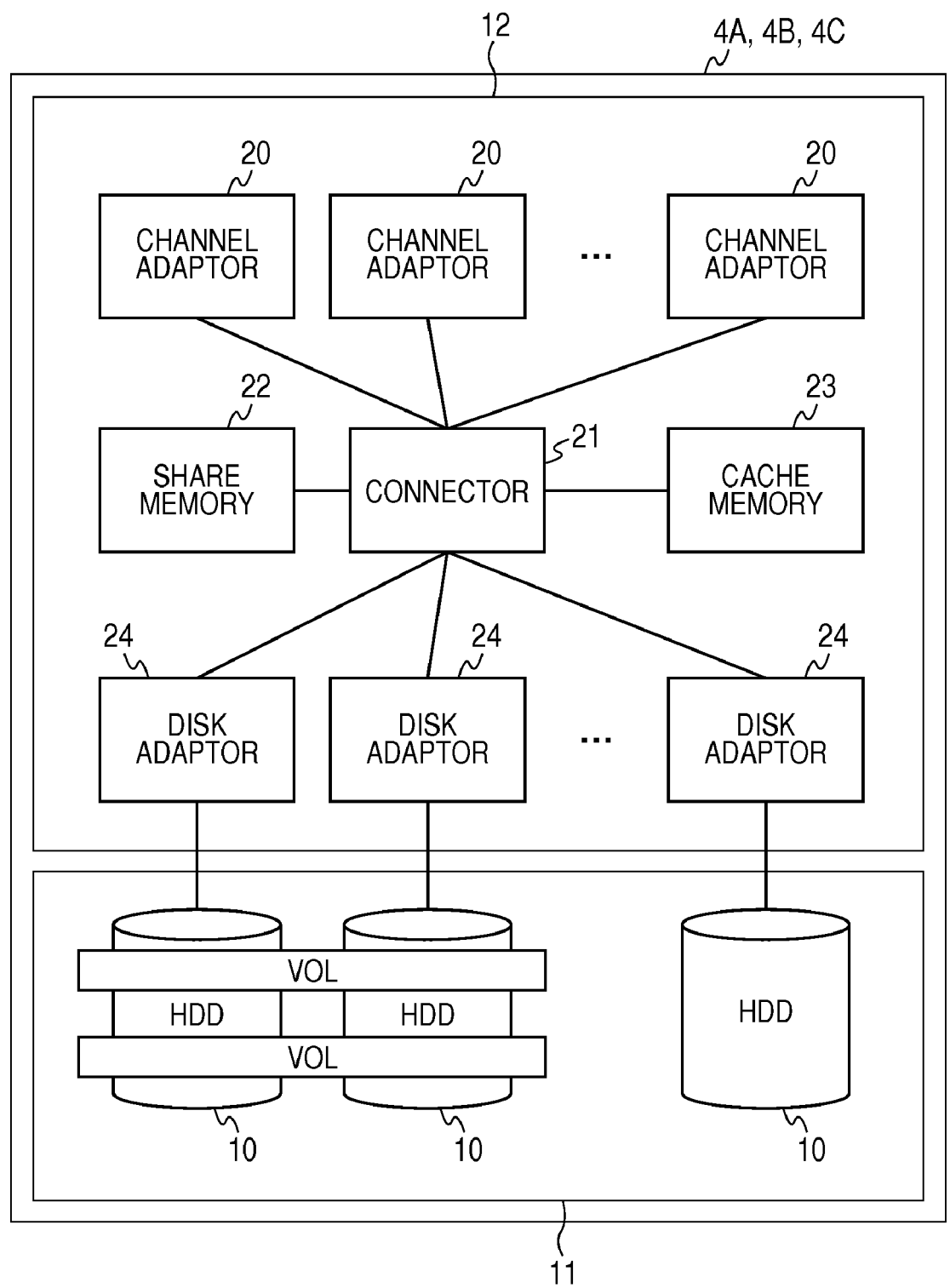
FIG. 2 is a block diagram to represent configurations of the first to the third storage devices.

Each of the first to the third storage devices 4A to 4C includes a disk array unit 11 configured of a plurality of hard disk devices 10 and a control unit 12 to control input/output of data with respect to the hard disk devices 10, as shown in FIG. 2.

The hard disk devices 10 are configured of, for example, a disk of high price such as an FC (Fiber Channel) or the like, or a disk of low price such as a SATA (Serial AT Attachment), or the like. One or a plurality of logical volumes VOL (hereinafter, referred to as "logical volume") are created in storage zones provided by the one or a plurality of hard disk devices 10. Data are stored in such logical volumes VOL in a unit of a predetermined size of blocks (hereinafter, referred to as "logical block").

A unique identifier (hereinafter, referred to as "logical volume number") is given to each of the logical volumes VOL. In the present embodiment, the input/output of the data is performed by designating an address which is a combination of the logical volume number and a unique number (LBA: Logical Block Address) of the logical block given to each of the logical block.

The control unit 12 includes a plurality of channel adaptors 20, a connector 21, a share memory 22, a cache storage device 23 and a plurality of disk adaptors 24.

Each of the channel adaptors 20 is configured of a micro computer system having a microprocessor, a memory and a communication interface and the like, which serves as an communication interface among the first to the third host computers 3A to 3C connected to a self-storage device, or among the first to the third storage devices 4A to 4C coupled to the self-storage device via a network.

The connector 21 is connected to the channel adaptors 20, the share memory 22, the cache memory 23 and the disk adaptors 24. Giving and receiving of data or commands among the channel adaptors 20, the share memory 22, the cache memory 23 and the disk adaptors 24 is performed over the connector 21. The connector 21 is configured of a switch or a bus such as a super-speed cross bus switch to perform data transmission by a high speed switching.

The share memory 22 is a memory shared by the channel adaptors 20 and the disk adaptors 24. Information relating to configuration information of the storage devices is stored in the share memory 22. As described later, a volume information table 30 (FIG. 3), a pair information table 31 (FIG. 4) and a journal group setting information table 32 (FIG. 5) are stored in the share memory 22 as well.

The cache memory 23 is also a memory shared by the channel adaptors 20 and the disk adaptors 24. The cache memory 23 is mainly used to temporarily memorize data input/output to/from the logical volumes VOL.

Each of the disk adaptors 24 is configured of a micro computer system having a microprocessor or memories and serves as an interface to perform a protocol control at the time of communication of each of the hard disk devices 10. The disk adaptors 24 are coupled to the corresponding hard disk devices 10 via, for example, a fiber channel cable and perform giving and receiving of data among the hard disk devices 10 according to a fiber channel protocol.

(2) Flow of Remote Copy in the Present Storage System

The flow of remote copy in the present storage system 1 will now be described using FIG. 1. Hereinafter, it is assumed that, a first logical volume VOL1 and a second logical volume VOL2 are installed in the first storage device 4A and data from the first host computer are read or written from or in the first logical volume VOL1. That is to say, the first logical volume VOL1 becomes a primary logical volume in the 3DC system in the present storage system 1.

Additionally, it is assumed that, a virtual logical volume VVOL (hereinafter, referred to as "virtual volume"), which is set as a pair of the first logical volume VOL1 and has no substance, and a first journal volume JVOL1 storing a journal described later are installed in the second the storage device 4B. A term "copy pair" means a pair of a logical volume VOL of a copy source and a logical volume VOL of a copy destination set to perform a data copy between the first and the second sites 2A and 2B, or the second and the third sites 2B and 2C.

In addition, it is assumed that, in the third storage device 4C, the second journal volume JVOL2 set as a copy pair of the first journal volume JVOL1, and a third logical volume VOLS which is a final backup volume (secondary logical volume) of the first logical volume VOL1 are installed.

First, a journal will be described. The journal is update history information of a certain logical volume created at the time of update of data stored in the logical volume, which is configured of the update data itself and information (hereinafter, referred to as "update information") such as an address within the logical volume where the update has been performed and a update time.

Data image in the logical volume of the copy source at a certain time point is copied to the logical volume of the copy destination (hereinafter, referred to as "initial copy"); thereafter, every time data is written in the logical volume of the copy source, the journal is created, which is transmitted to the storage device of the copy destination.

The storage device of the copy destination reflects the transmitted journal to the logical volume of the copy destination in an older order. With this, when the data image in the logical volume of the copy source is updated, the data image in the logical volume of the copy destination can be updated. "The reflection of the journal" means that write data included in the journal is written in a designated address location by the update information included in such journal in the logical volume of the copy destination.

A group of logical volumes, which is configured of the logical volume and the journal volume storing the journal relating to the logical volume, is referred to as "a journal group." In the present storage system, one journal group JG1 is constructed by a virtual volume VVOL and the first journal volume JVOL1 and another journal group JG2 is constructed by the second journal volume JVOL2 and the third logical volume.

The flow of remote copy in the present storage system 1 is described continuously. When receiving a write command and write data for the first logical volume VOL1 from first host computer 3A (the arrow in FIG. 1), the first storage device 4A stores the write data in an address location within the first logical volume VOL1, designated by the write command. Additionally, the first storage device 4A transmits such write data to the second storage device 4B along with a write command to cause the virtual volume VVOL to be set as a recording destination (the arrow a1 in FIG. 1).

Once the second storage device 4B receives the write command and the write data sent from the first storage device 4A, it creates a journal based on the write command and the write data, and then stores the created journal in the first journal volume JVOL1 (the arrow a2 in FIG. 1). In addition, the second storage device 4B transmits the journal stored in the first journal volume JVOL1 to the third storage device 4C, asynchronously with transmission of the write command and the write data from the first storage device 4A (the arrow a3 in FIG. 1).

The third storage device 4C stores the journal transmitted from the second storage device 4B in the second journal volume JVOL2. The third storage device 4C reads the journal stored in the second journal volume JVOL2 and reflects the corresponding journal to the third logical volume VOLS (the arrow a4 in FIG. 1)

Methods of remote copying the journal stored in the first journal volume JVOL1 of the second storage device 4B to the second journal volume JVOL2 of the third storage device 4C includes a method in which the second storage device 4B as the subject transmits the journal to the third storage device 4C (hereinafter, referred to as "PUSH method"), and a method in which the third storage device 4C as the subject reads out the journal from the second storage device 4B (hereinafter, referred to as "PULL method").

In the PULL method, a command for reading the journal (hereinafter, referred to as "journal read command") is given to the second storage device 4B from the third storage device 4C. When the second storage device 4B receives the journal read command from the third storage device 4C, it reads the journal not-transmitted to the third storage device 4C from the first journal volume JVOL1 for transmission to the third storage device 4C. Hereinafter, it is assumed that the PULL method is employed as a method of transmitting the journal to the third storage device 4C from the second storage device 4B.

As means for performing the remote copy described above, the share memory 22 of the first to third storage devices 4A to 4C stores the volume information table 30 as shown in FIG. 3 and the pair information table 31 as shown in FIG. 4, and the share memory 22 of the second and the third storage devices 4B and 4C stores the journal group setting information table 32 as shown in FIG. 5.

The volume information table 30 (FIG. 3) is a table by which the channel adaptors 20 of the first to the third storage devices 4A to 4C manage the logical volumes VOL set in the self-storage devices, which is, as shown in FIG. 3, configured of a logical volume number column 30A, a volume state column 30B and a pair number column 30C.

The logical volume numbers given to the respective logical volumes VOL (also include the virtual volume VVOL and the journal volumes JVOL1 and JVOL2) in the first to the third storage devices 4A to 4C are stored in the logical volume number column 30A. The states of the corresponding logical volumes VOL are stored in the volume state column 30B, and, in the pair column 30C, when a corresponding logical volume VOL is set as a copy pair of another logical volume VOL, a unique identifier (hereinafter, referred to as "pair number") given to the copy pair is stored. In addition, the pair number is the same as a pair number stored in a pair number column 31A of the pair information table 31 described later in FIG. 4.

Thus, an example of FIG. 3 shows that a state of the logical volume VOL (the virtual volume VVOL) having the logical volume number "1" is "normal," and the logical volume VOL configures the copy pair having the pair number "1" together with another logical volume VOL (the first logical volume VOL1).

The pair information table 31 (FIG. 4) is a table for managing a copy pair by the channel adopters 20 in the first storage device 4A to the third storage device 4C, in case that the logical volume VOL registered in the above volume information table 30 is set as such copy pair of another logical volume VOL set in the self-storage device or the other storage devices. The pair information table 31 is configured of a pair number column 31A, a pair state column 31B, an intra-device logical volume number column 31C, an other device number column 31D, an other logical volume number column 31E and a virtualized flag column 31F, as shown in FIG. 5.

A pair number given to the corresponding copy pair is stored in the pair number column 31A, and a state of the corresponding copy pair is stored in the pair state column 31B. The state of the copy pair includes "synchronization" that a update content in the logical volume VOL of the copy source is synchronously or asynchronously reflected to the logical volume VOL of the copy destination, "obstacle" that the update content in the logical volume VOL of the copy source is not reflected to the logical volume VOL of the copy destination, and "synchronizing" that a difference between the logical volume VOL of the copy source and the logical volume VOL of the copy destination is reflected to the logical volume VOL of the copy destination in order to transfer to the "synchronization" state from the "obstacle" state.

In the intra-device logical volume column 31C, logical volume numbers of the logical volumes VOL within the first to third storage devices 4A to 4C, configuring the corresponding copy pair are stored. In the other logical volume number column 31E, logical volume numbers of logical volume VOL of the other side (hereinafter, referred to as "the other side logical volume") configuring the copy pair together with the logical volumes VOL of which the logical volume numbers VOL is stored in the intra-device logical volume number column 31C are stored. In the other device number column 31D, unique identifiers (hereinafter, referred to as "device number") given to the storage devices (the first storage device 4A to the third storage device 4C) having the other side logical volumes VOL are stored.

Flags to represent whether the other logical volumes VOL are virtual volumes or not (hereinafter, referred to as "virtualization flag") are stored in the virtualized flag 31F. Such virtualized flag is set to ON when the other logical volume VOL is a virtual volume and is set to off(0) when the other logical volume VOL is not a virtual volume (that is, a typical logical volume with a substance).

Therefore, it is known from an example of FIG. 4 that the copy pair having the pair number "1" is in a state ("synchronization") that a synchronization has been made between the logical volume VOL of the copy source and the logical volume VOL of the copy destination, and, regarding to the other logical volume VOL, the logical volume number "1" set in the storage device having the device number "1" is a virtual volume (the virtualization flag is "ON.")

The journal group setting information table 32 (FIG. 5) is a table by which the channel adaptors 20 of the second and the third storage devices 4B and 4C manage the journal groups JG1 and JG2 (FIG. 1) set in the self-storage devices, and, as shown in FIG. 5, is configured of a journal group number column 32A, a source volume column 32B, a journal volume number column 32C, a path obstacle detection checking time column 32D and a path disconnection detecting time column 32E.

A unique identifier (hereinafter, referred to as "journal group number") given to each of the journal groups JG1 and JG2 set in the second or the third storage device 4B or 4C is stored in the journal group number column 32A. A logical volume number of the journal volume (the first or the second journal volume JVOL1 or JVOL2) belonging to the journal groups JG1 and JG2 is stored in the journal volume column 32C, and a logical volume number of the logical volume VOL configuring the journal groups JG1 and JG2 together with the journal volume is stored in the source volume column 32B.

In addition, in the path obstacle detection checking time column 32D, a time is stored that it takes for the channel adaptors 20 to recognize occurrence of an obstacle after the obstacle occurs in paths (the networks 6A and 6B) for transmission/reception of the journal of the corresponding journal groups JG1 and JG2 (hereinafter, the time is referred to as "path obstacle detection checking time."). In the present storage system 1, the time is a time until the channel adaptors 20 recognize the occurrence of the obstacle in the networks 6A and 6B after no receipt of a heart beat signal mutually exchanged between the second and the third storage devices 4B and 4C. The time is set by a user and is stored in the path obstacle detection checking time column 32D as a path obstacle detection checking time. A time (year/month/day/hour/minute) when the channel adaptors 20 detect the obstacle of the path is stored in the path disconnection detecting time column 32E.

Thus, an example of FIG. 5 shows that the journal group JG1 or JG2 having the journal group number "1" is configured of the logical volume VOL having the logical volume number "1" and the journal volume JVOL1 or JVOL2 having the logical volume number "3," and the path obstacle detection checking time is set to "5 minutes."

FIGS. 6 to 10 show flows of commands and data within the first to the third storage devices 4A to 4C at the time of the remote copy described above. In FIGS. 6 to 10, a thin arrow represents a flow of command and a thick arrow represents a flow of data.

In FIGS. 6 to 10, a command receipt processing program 40, a command transmission processing program 41, a journal read processing program 43, a restore processing program 44 and a difference processing program 45 are processing programs embedded in the channel adaptors 20, and read/write processing program 42 is a processing program embedded in the disk adaptors 24.

In FIGS. 6 to 10, when the thin arrow having a certain processing program as a start point is drawn, it represents that a command is issued towards an endpoint of the arrow from the processing program, and, when the thick arrow having a processing program as a start point or passing through the processing program is drawn, it represents that data are transmitted along the arrow based on the processing program.

Figure 6:
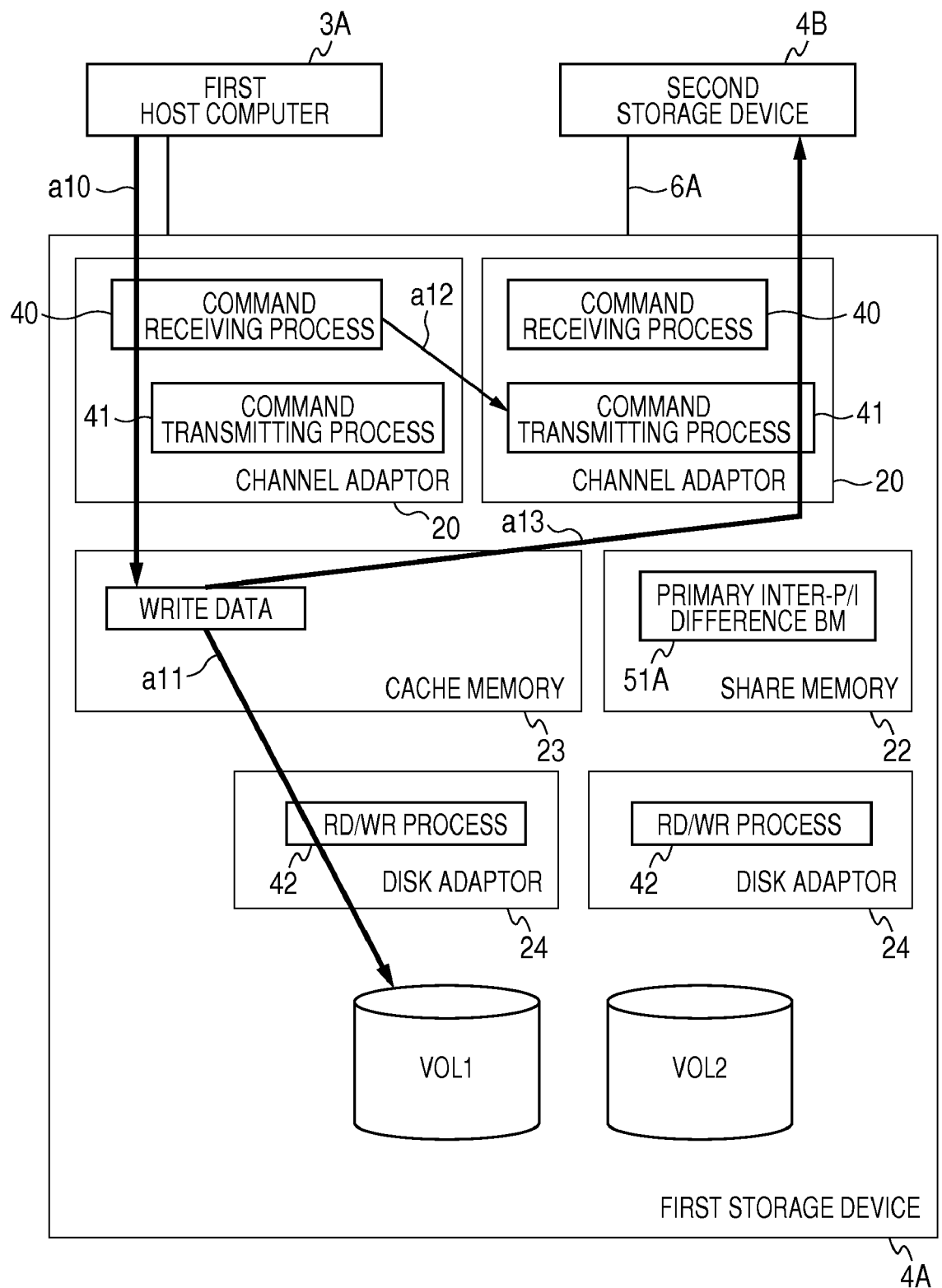
FIG. 6 is a block diagram to be provided for description of the remote copy process in the first storage device.

As shown in FIG. 6, when a write command and write data are given to the first storage device 4A from the first host computer 3A, the channel adaptors 20 of the first storage device 4A to have received the write command and the write data save the write data in the cache memory 23 (the arrow a10 in FIG. 6) as well as save the write command in the share memory 22.

The write data saved in the cache memory 23 are read out from the cache memory 23 by the corresponding disk adaptors 24 and then are stored in an address location, designated by the write command, within the logical volume VOL1 designated by the write command saved in the share memory 22 (the arrow a11 in FIG. 6).

The channel adaptors 20 to have received the write command and the write data transmit a command (hereinafter, referred to as "data transmission command"), which causes the write data related to the channel adaptor 20 connected to the second storage device 4B to be transmitted to the second storage device 4B with reference to the volume information table 30 (FIG. 3) and the pair information table 31 (FIG. 4) (the arrow a12 in FIG. 6).

The channel adaptor 20 to have received such data transmission command reads the write data stored in the cache memory 23 with reference to the volume information table 30 (FIG. 3) and the pair information table 31 and transmits to the second storage device 4B the read write data together with a write command which designates the virtual volume VVOL as a write destination (the arrow a13 in FIG. 6).

Figure 7:
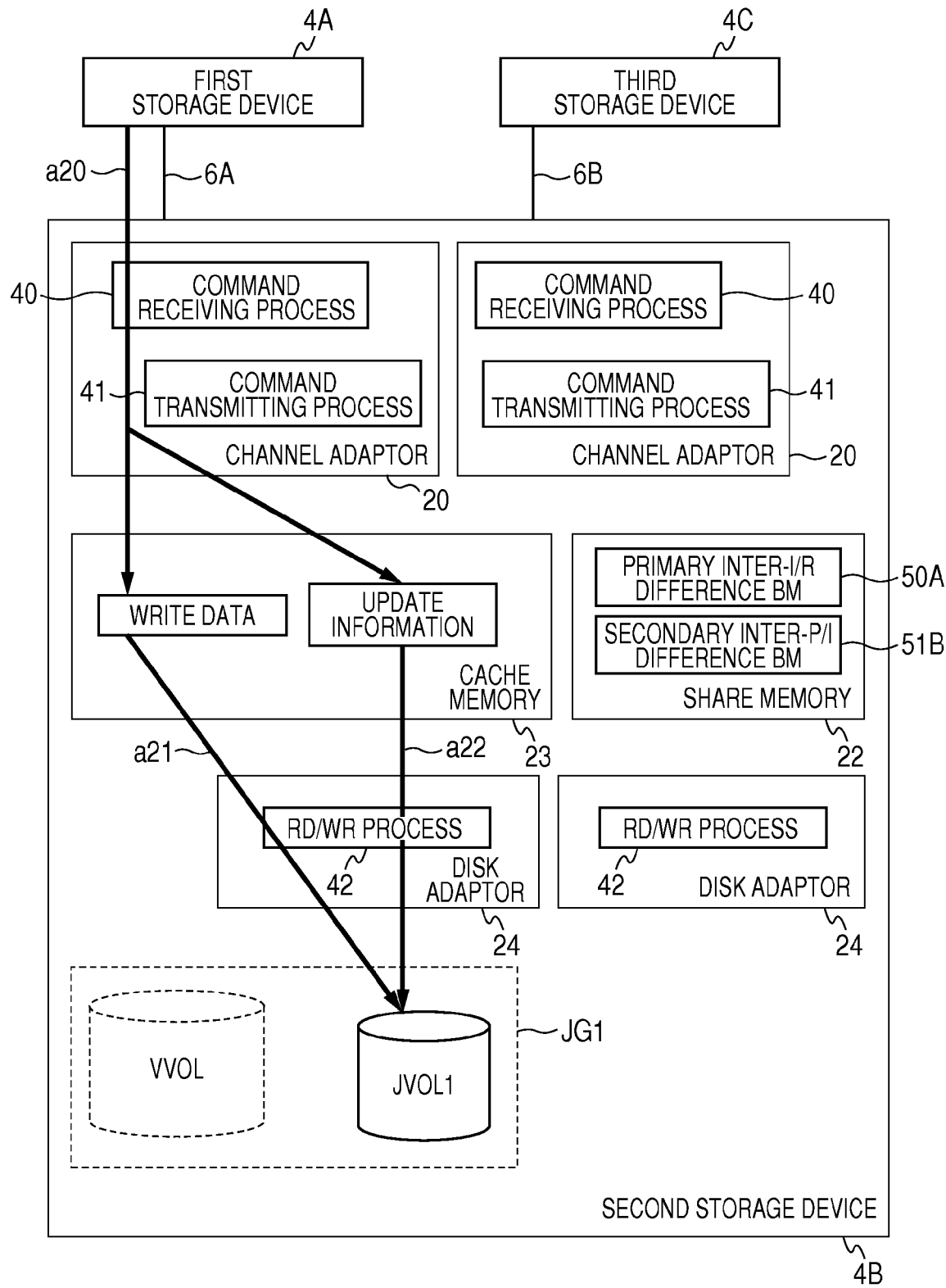
FIG. 7 is a block diagram to be provided for description of the remote copy process in the second storage device.

On the other hand, the channel adaptor 20 of the second storage device 4B to have received such write command and the write data stores the write command in the share memory 22 and stores the write data in the cache memory 23, as shown in FIG. 7. The channel adaptor 20 creates update information of the journal based on the write command for storing in the cache memory 23 (the arrow a20 in FIG. 7).

The channel adaptor 20 reports completion of writing of the write data to the first storage device 4A. The channel adaptor 20 of the first storage device 4A receiving the report transmits a notification of the data writing completion to the first host computer 3A via the channel adaptors 20 connected to the first host computer 3A.

In addition, the write data and the update information stored in the cache memory 23 of the second storage device 4B are read from the cache memory 23 by the disk adaptor 24 in charge of the first journal volume JVOL1 and are stored in the first journal volume JVOL1 as a journal of the write data (the arrows a21 and a22 in FIG. 7).

Figure 9:
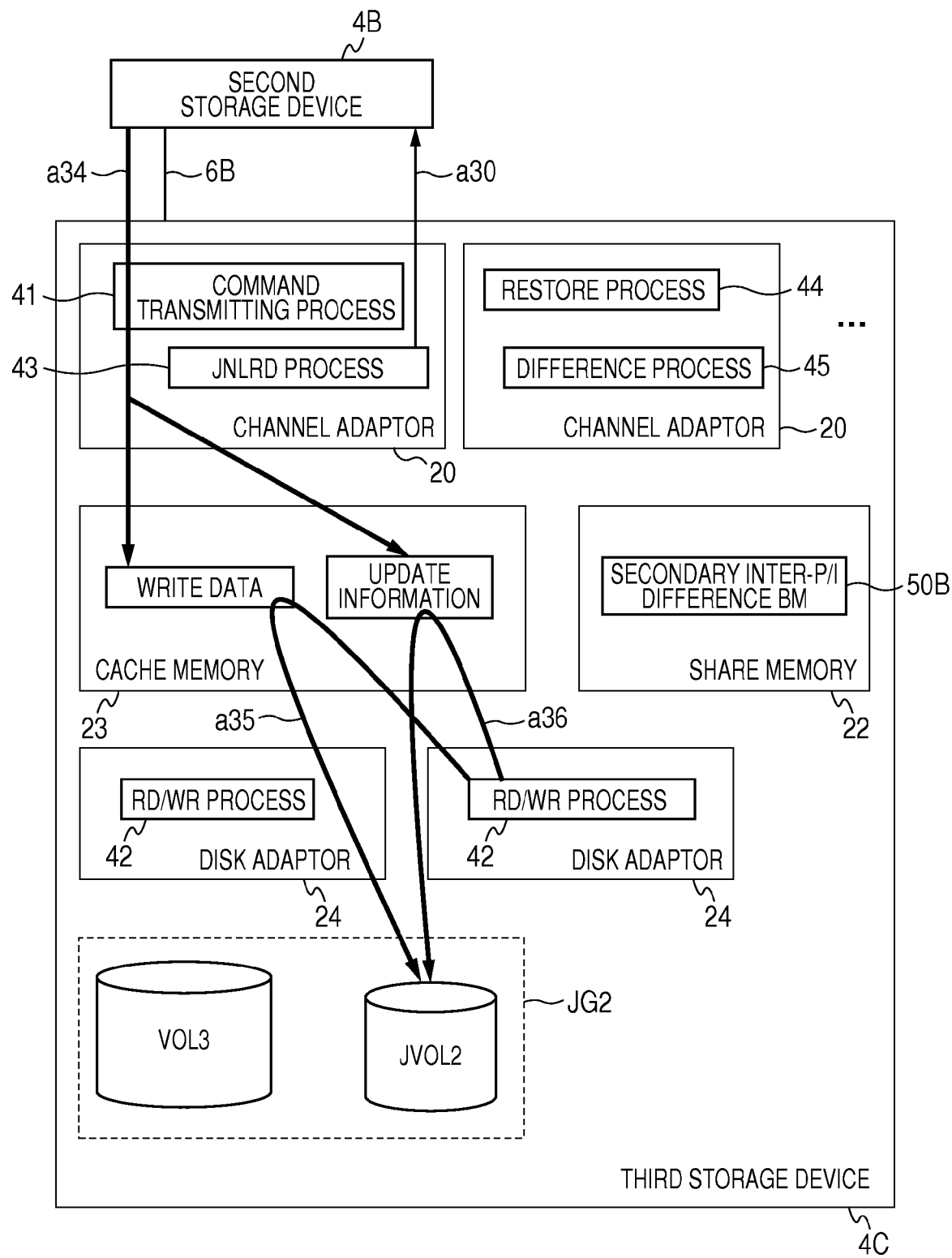
FIG. 9 is a block diagram to be provided for description of the remote copy process in the third storage device.

Meanwhile, as shown in FIG. 9, the channel adaptor 20 connected to the second storage device 4B of the channel adaptors 20 in the third storage device 4C transmits a read journal command to the second storage device 4B at a convenient timing depending on a situation of load thereof (the arrow a30 in FIG. 9).

Figure 8:
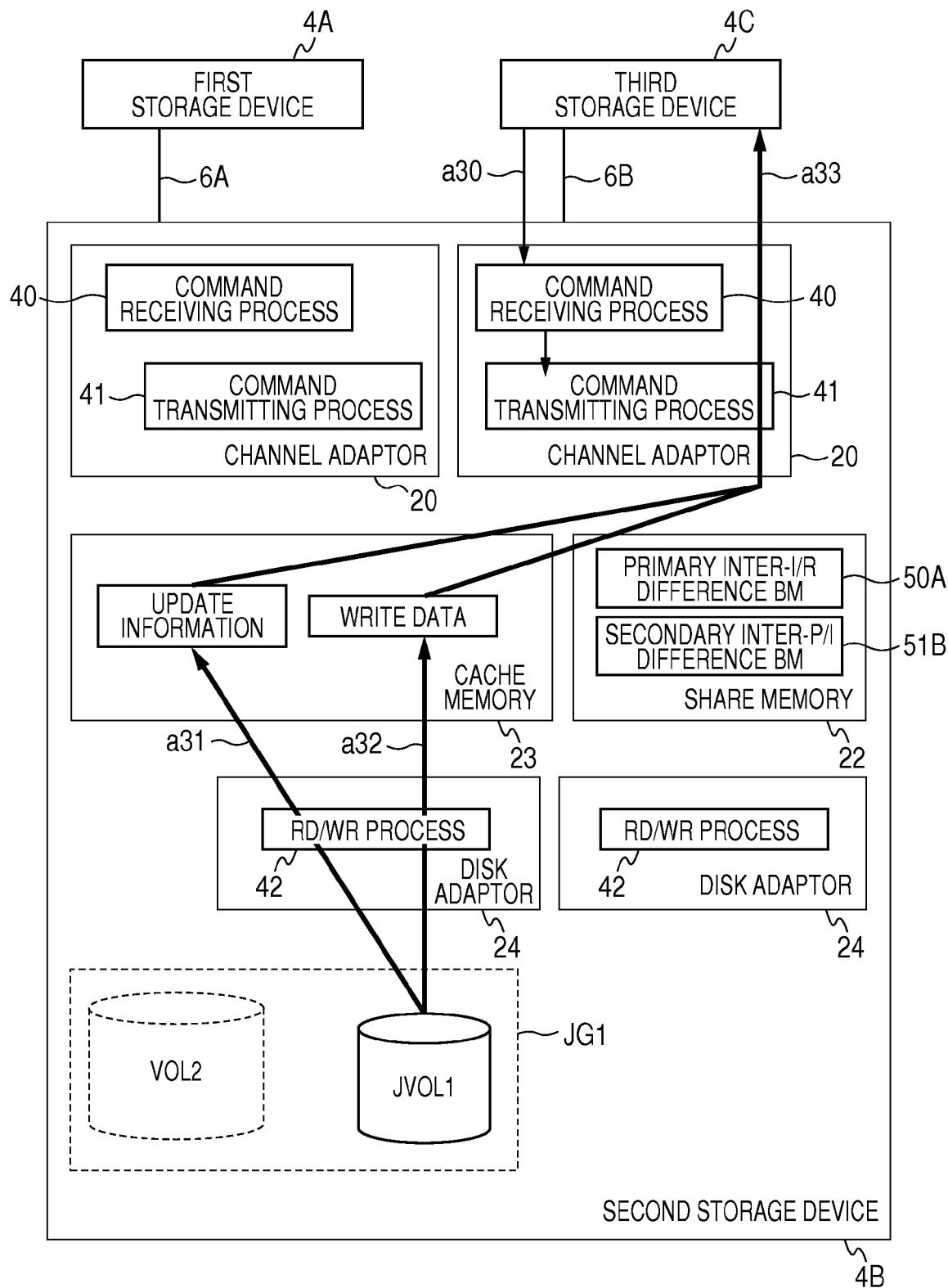
FIG. 8 is a block diagram to be provided for description of the remote copy process in the second storage device.

The channel adaptor 20 of the second storage device 4B to have received the read journal command, as shown in FIG. 8, examines whether journals not transmitted to the third storage device 4C are present in the first journal volume JVOL1. The channel adaptor 20 transmits a read command for such journals to the disk adaptor 24 in charge of the first journal volume JVOL1 when the journals are present in the first journal volume JVOL1.

The disk adaptor 24 to have received such read command reads the earliest journal in a creation order of the journals stored in the first journal volume JVOL1 from the first journal volume JVOL1 and stores it in the cache memory 23 (the arrow a31 and a32 in FIG. 8). The journal stored in the cache memory 23 is then read from the cache memory 23 by the channel adaptor 20 connected to the third storage device 4C and is transmitted to the third storage device 4C (the arrow a33 in FIG. 8).

In the third storage device 4C, as shown in FIG. 9, the channel adaptor 20 to have received such journal stores the corresponding journal in the cache memory 23 (the arrow a34 in FIG. 9). The journal stored in the cache memory 23 is then read from the cache memory 23 by the disk adaptor 24 in charge of the second journal volume JVOL2 and is stored in the second journal volume JVOL2 as a journal (the arrows a35 and a36 in FIG. 9).

Figure 10:
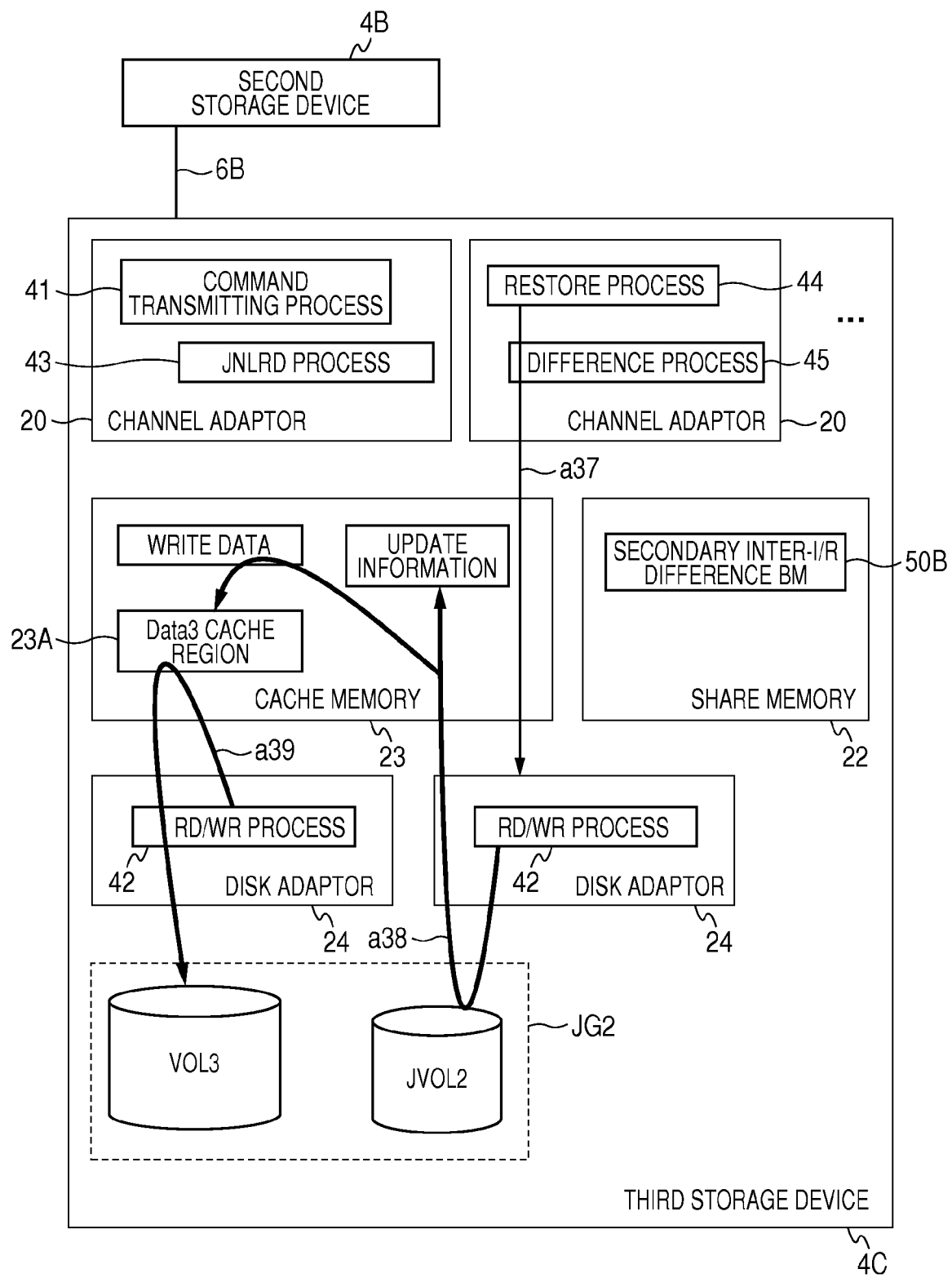
FIG. 10 is a block diagram to be provided for description of the remote copy process in the third storage device.

Thereafter, as shown in FIG. 10, a restore command is given to the disk adaptor 24 in charge of the second journal volume JVOL2 from the a specific or an arbitrary channel adaptor 20 (the arrow a37 in FIG. 10). The disk adaptor 24 to have received the restore command reads the journals stored in the second journal volume JVOL2 one by one to store the update information in the journal in the cache memory 23 as well as store the write data in the journal in a cache region 23A within the cache memory 23 (the arrow a38 in FIG. 10).

The write data stored in the cache region 23A is read by the disk adaptor 24 in charge of the third logical volume VOL3. The disk adaptor 24 writes the associated write data in the corresponding address location within the third logical volume VOL3 with reference to the corresponding update information stored in the cache memory 23 (the arrow a39 in FIG. 10).

As described above, in the present storage system 1, the data written in the first logical volume VOL1 is remote-copied to the third logical volume VOLS via the second storage device 4B.

(3) A Synchronization Unlocking Process and a Resynchronization Process Among the First to the Third Storage Devices A synchronization unlocking process performed in the second and the third storage devices 4B and 4C, which stops the remote copy of the journals between the second and the third storage devices 4B and 4C due to occurrence of an obstacle in the network 6B connecting the second and the third storage devices 4B and 4C or by indication of a user, and, a resynchronization process performed in the first to the third storage devices 4A to 4C by manipulation of a user upon resumption of such remote copy process, will now be described using FIGS. 11 to 28.

In FIGS. 11 to 28, a thin arrow represents a flow of command and a thick arrow represents a flow of data. In FIGS. 11 to 28, a command receipt processing program 40, a command transmission processing program 41, a journal read processing program 43, a restore processing program 44, a difference processing program 45 and a pair state check processing program 46 are processing programs embedded in the channel adaptors 20, and read/write processing program 42 is a processing program embedded in the disk adaptors 24.

In addition, in FIGS. 11 to 28 except for FIGS. 14, 16, 20, 22, 25 and 27, when the thin arrow having a certain processing program as a start point is drawn, it represents that a command is issued towards an endpoint of the arrow from the processing program, and, when the thick arrow having a processing program as a start point or passing through the processing program is drawn, it represents that data are transmitted along the arrow based on the processing program.

(3-1) Synchronization Unlocking Process

Figure 11:
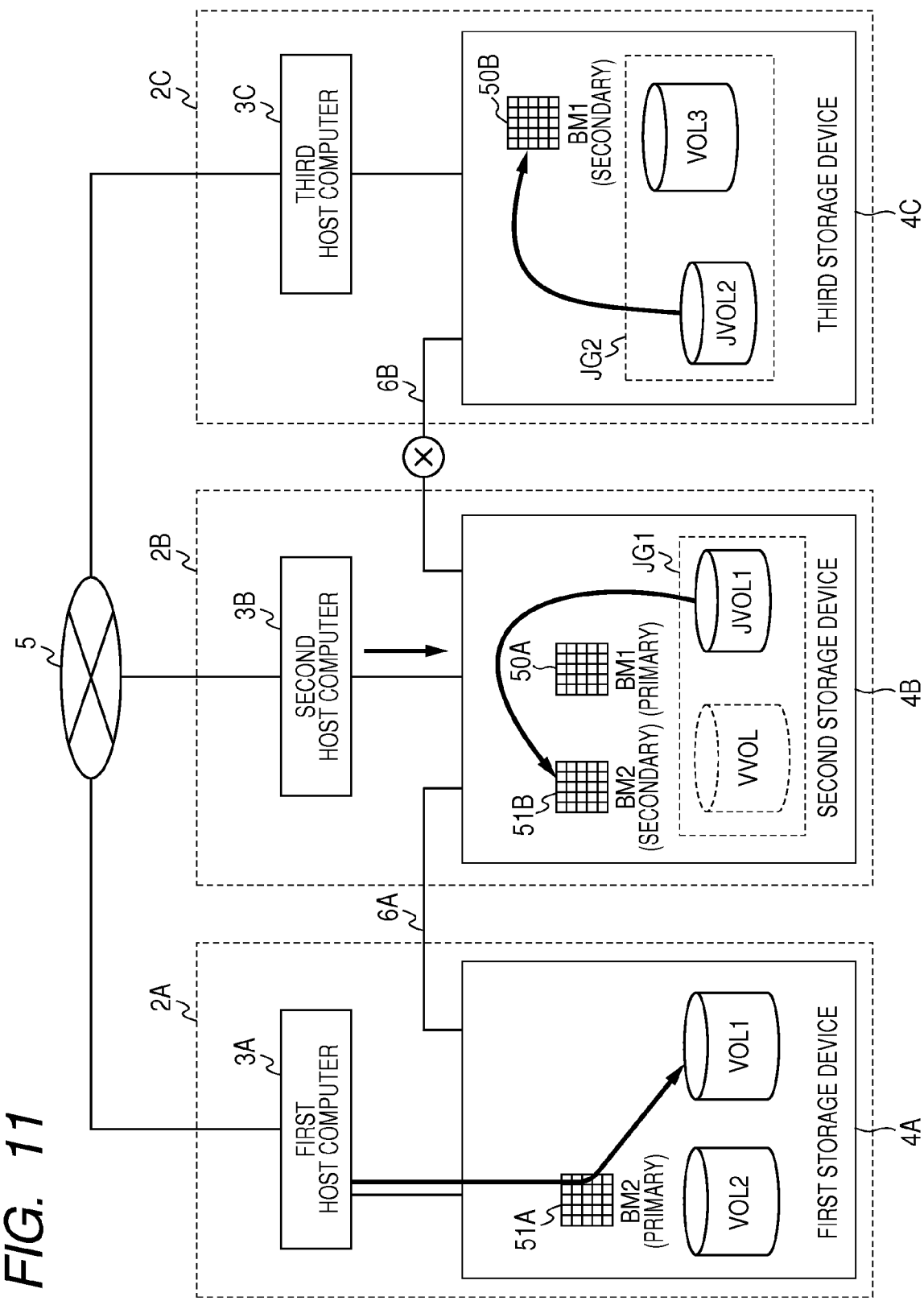
FIG. 11 is a block diagram to be provided for description of the synchronization unlocking process in the first to the third storage devices.

First, the synchronization unlocking process will be described. When the second and the third storage devices 4B and 4C detect occurrence of an obstacle in the network 6B or an indication for stopping the remote copy between the second and the third storage devices 4B and 4C is given from a user, each of them manages data, which are held by the self-storage device, not reflected to the third logical volume VOLS, as shown in FIG. 11.

In detail, the second and the third storage devices 4B and 4C manage address locations within the third logical volume VOL3 reflecting the respective journals stored in the first or the second journal volume JVOL1 or JVOL2 in the self-storage device, using a secondary inter-P/I difference bit map 51B or a secondary inter-I/R difference bit map 51B.

The first storage device 4A manages an address location, which is updated after stopping of the remote copy between the second and the third storage devices 4B and 4C, within the first logical volume VOL1, using a primary inter-P/I difference bit map 51A.

Figure 12:
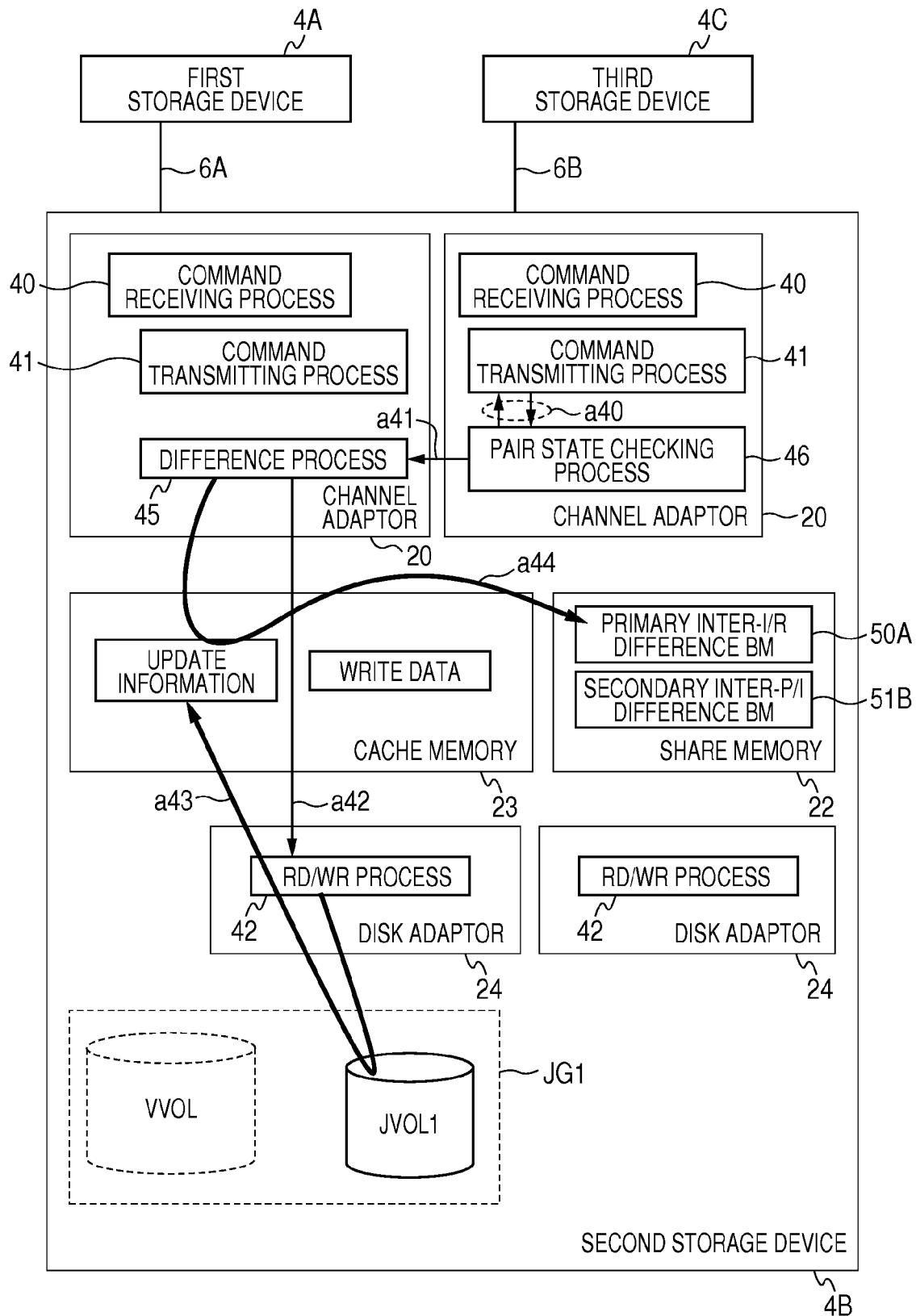
FIG. 12 is a block diagram to be provided for description of the synchronization unlocking process in the second storage device.

FIG. 12 shows a flow of the synchronization unlocking process performed in the second storage device 4B when the second storage device 4B detects an obstacle occurred in the network 6B.

The channel adaptor 20 connected to the third storage device 4C, of the channel adaptors 20 of the second storage device 4B, transmits a predetermined signal for check to the third storage device 4C based on the pair state check processing program 46, and, always checks a state of the network 6B connecting the second and the third storage devices 4B and 4C based on a response or not of the third storage device 4C to the signal for check (the arrow a40 in FIG. 12).

When the channel adaptor 20 transmits the signal for check to the third storage device 4C and then does not receive a response from the third storage device 4C even after a time elapsed exceeding the corresponding path obstacle detection checking time set in the journal group setting information table 32 (FIG. 5), it transmits a synchronization unlocking command to the channel adaptor 20 connected to the first storage device 4A (the arrow a41 in FIG. 12).

The channel adaptor 20 to have received such synchronization unlocking command first changes into an "obstacle" the pair state stored in the pair state column 31B of the entry corresponding to the copy pair configured of the first and the second journal volumes JVOL1 and JVOL2, of the entries in the pair information table 31, as shown in FIG. 14.

Subsequently, the channel adaptor 20 issues a read command which reads the update information in one journal of the journals stored in the first journal volume JVOL1 at such time point so as to be stored in the cache memory 23, to the disk adaptor 24 in charge of the first journal volume JVOL1 of the synchronization unlocking object (the arrow a42 in FIG. 12).

The disk adaptor 24 to have received such read command holds the write data and the update information thereof not stored in the first journal volume JVOL1 yet of the write data and the update information thereof held in the cache memory 23, to the first journal volume JVOL1 as a journal. The disk adaptor 24 then reads update information in one journal stored in the first journal volume JVOL1 and stores the read update information in the cache memory 23 (the arrow a43 in FIG. 12).

Successively, the channel adaptor 20 to have received the synchronization unlocking command creates a difference bit map (hereinafter, referred to as "primary inter-I/R difference bit map") 50A that a bit is installed by mapping each block of the first logical volume VOL1 provided by the first host computer 3A, on the share memory 22. All of bits on the primary inter-I/R difference bit map 50A are set to off ("0") at the beginning.

The channel adaptor 20 to have received the synchronization unlocking command determines an address location in on the third logical volume VOL3 to which the corresponding journal is to be reflected, based on the read update information from the cache memory 23, and sets a bit corresponding to the address location on the primary inter-P/I difference bit map 50A to ON (the arrow a44 in FIG. 12).

Thereafter, the channel adaptor 20 performs the same process for all of the journals stored in the first journal volume JVOL1. With this, an address location in the third logical volume VOL3 to which the journals held in the first journal volume JVOL1 are to be reflected, is registered in the primary inter-I/R difference bit map 50A, at the time of detection of the obstacle of the network 6B connecting the second and the third storage devices 4B and 4C.

Figure 13:
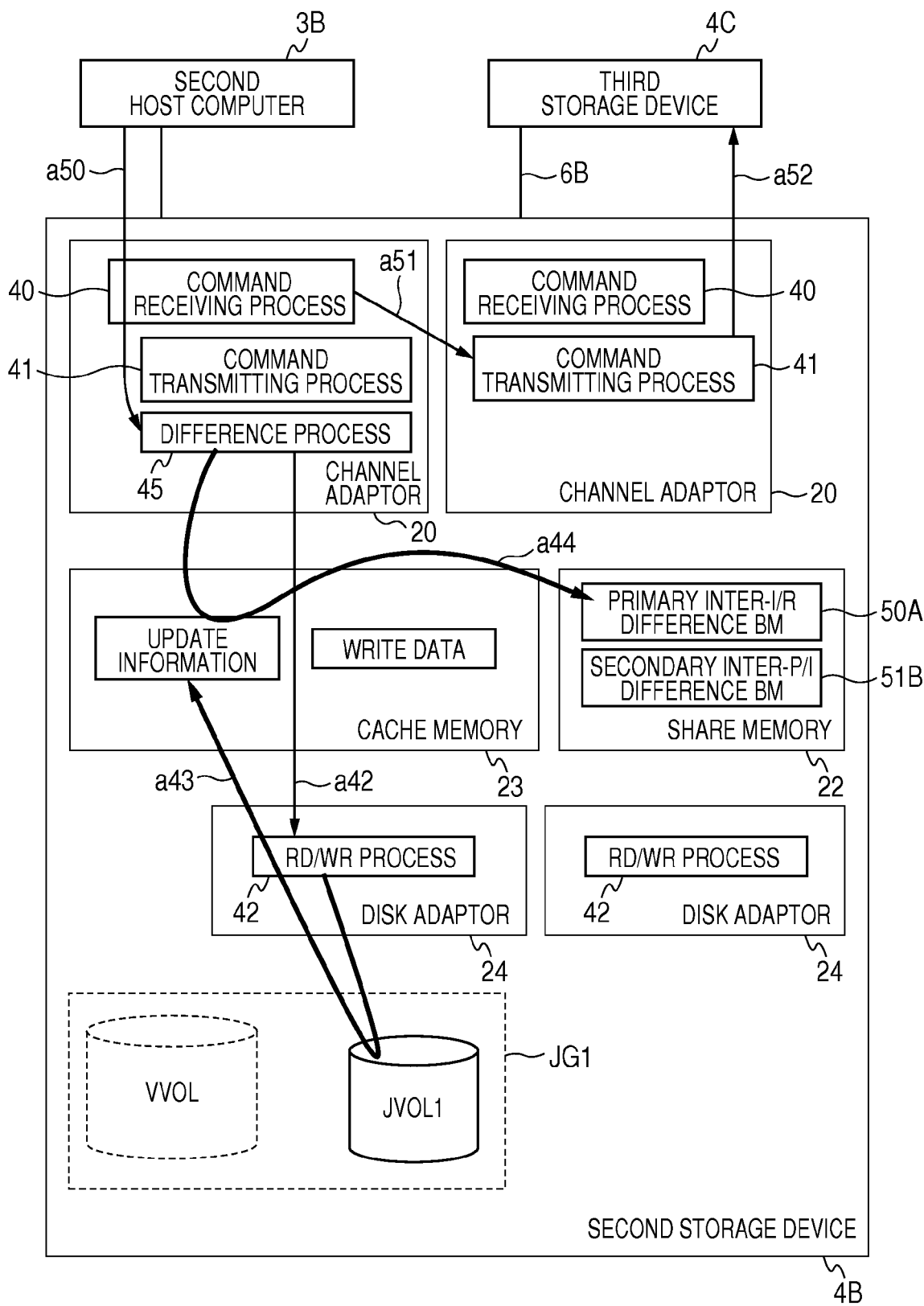
FIG. 13 is a block diagram to be provided for description of the synchronization unlocking process in the second storage device.

In the meantime, FIG. 13 shows a detailed process content of the second storage device 4B, for example, in a case of the second host computer 3B giving a synchronization unlocking command (the arrow a50 in FIG. 13) for unlocking a synchronization between the first and the second journal volumes JVOL1 and JVOL2 to the second storage device 4B.

In this case, the channel adaptor 20 of the second storage device 4B to have received the synchronization unlocking command transmits it to the channel adaptor 20 connected to the third storage device 4C (the arrow a51 in FIG. 13). The channel adaptor 20 connected to the third storage device 4C transmits the received synchronization unlocking command to the third storage device 4C (the arrow a52 in FIG. 13).

The channel adaptor 20 connected to the first storage device 4A performs the same process as described for the arrows a42 and a44 in FIG. 12. As a result, similar to FIG. 12, in this case, too, an address location in the third logical volume VOL3 to which the journal held in the cache memory 23 or the first journal volume JVOL1 is to be reflected is registered in the primary inter-I/R difference bit map 50A, at the time point when such synchronization unlocking command is given to the second storage device 4B.

Figure 15:
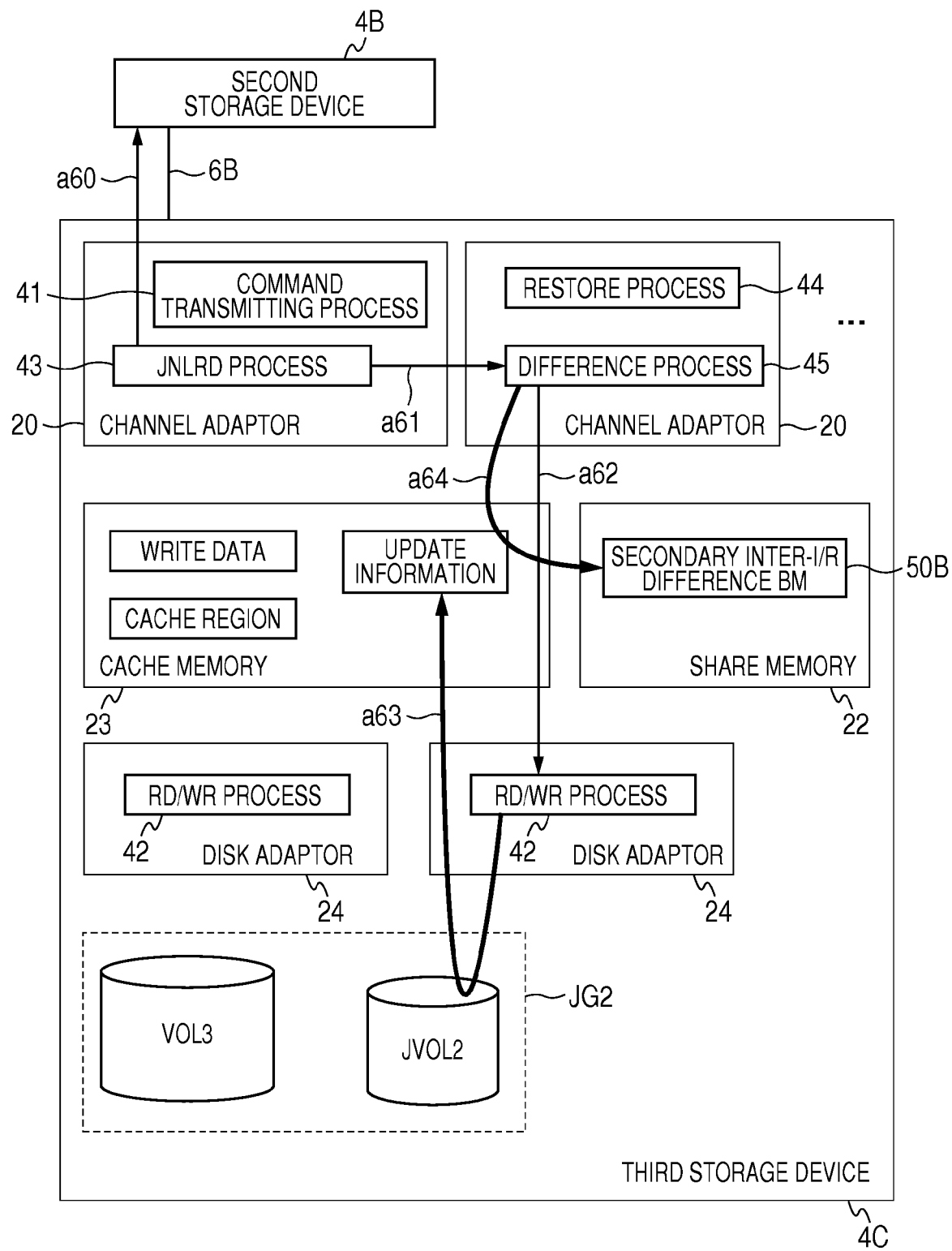
FIG. 15 is a block diagram to be provided for description of the synchronization unlocking process in the third storage device.

FIG. 15 shows a flow of a process of the third storage device 4C when the third storage device 4C detects an obstacle occurred in the network 6B connecting the second and the third storage devices 4B and 4c.

When the channel adaptor 20 connected to the second storage device 4B of the channel adaptors 20 of the third storage device 4C transmits a read journal command to the second storage device 4B according to a request from itself or different channel adaptors 20 (the arrow 60a in FIG. 15), it continues to measure a time until a response is received after the corresponding read journal command was transmitted.

When the channel adaptor 20 transmits the read journal command to the second storage device 4B and then does not receive a response from the second storage device 4B even after a time elapsed exceeding the corresponding path obstacle detection checking time set in the journal group setting information table 32 (FIG. 5), it transmits a synchronization unlocking command to the channel adaptor 20 connected to a specific or an arbitrary channel adaptor 20 (the arrow a61 in FIG. 15).

The channel adaptor 20 to have received such synchronization unlocking command first updates into an "obstacle" the pair state stored in the pair state column 31B of the entry corresponding to the copy pair configured of the first and the second journal volumes JVOL1 and JVOL2, of the entries in the pair information table 31, as shown in FIG. 16.

Subsequently, the channel adaptor 20 to have received the synchronization unlocking command issues a read command which reads the update information in one journal of the journals stored in the second journal volume JVOL2 at such time point, to the disk adaptor 24 in charge of the second journal volume JVOL2 of the synchronization unlocking object (the arrow a62 in FIG. 15).

The disk adaptor 24 to have received such read command stores the write data and the update information thereof not stored in the second journal volume JVOL2 yet of the write data and the update information thereof held in the cache memory 23, in the second journal volume JVOL2 as a journal. The disk adaptor 24 then reads update information in one journal stored in the second journal volume JVOL2 from the second journal volume JVOL2 and stores the read update information in the cache memory 23 (the arrow a63 in FIG. 15).

Successively, the channel adaptor 20 to have received the synchronization unlocking command creates a difference bit map (hereinafter, referred to as "secondary inter-I/R difference bit map") 50B that a bit is installed by mapping each block of the first logical volume VOL1, on the share memory 22. All of bits on the secondary inter-I/R difference bit map 50B are set to off ("0") at the beginning.

The channel adaptor 20 to have received the synchronization unlocking command determines an address location in on the third logical volume VOL3 to which the corresponding journal is to be reflected, based on the read update information from the cache memory 23, and sets a bit corresponding to the address location on the secondary inter-I/R difference bit map 50B to ON (the arrow a64 in FIG. 15).

Thereafter, the channel adaptor 20 performs the same process for all of the journals stored in the second journal volume JVOL2. With this, an address location in the third logical volume VOL3 to which the journals held in the cache memory 23 or the second journal volume JVOL2 are to be reflected, is registered in the secondary inter-I/R difference bit map 50B, at the time of detection of the obstacle of the network 6B connecting the second and the third storage devices 4B and 4C.

Also, when the synchronization unlocking command is given to the second storage device 4B via the first storage device 4A from the first host computer 3A, the third storage device 4C performs the same process. In this case, as described in FIG. 13, the synchronization unlocking command is transmitted to the third storage device 4C from the second storage device 4B. The channel adaptor 20 of the third storage device 4C to have received the synchronization unlocking command transmits the synchronization unlocking command to a specific or an arbitrary channel adaptor 20.

The specific or the arbitrary channel adaptor 20 to have received the synchronization unlocking command performs the synchronization unlocking process as described above. With this, an address location in the third logical volume VOL3 to which the journals held in the second journal volume JVOL2 are to be reflected, is registered in the secondary inter-I/R difference bit map 50B which is created in the third storage device 4C, at the time of transmission of the synchronization unlocking command from the second storage device 4B.

Figure 17:
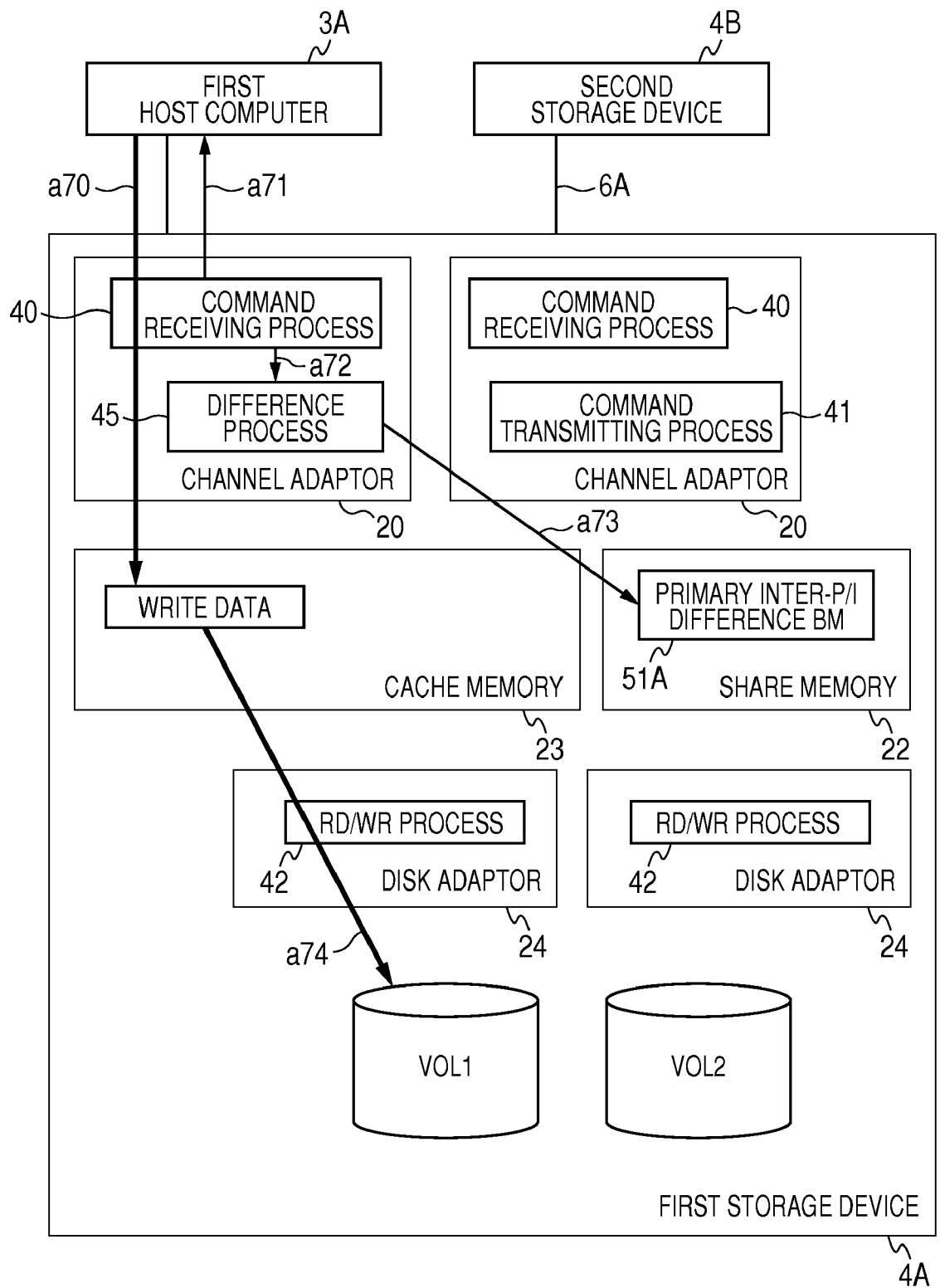
FIG. 17 is a block diagram to be provided for description of the synchronization unlocking process in the first storage device.

FIG. 17 shows a detailed process content of the first storage device 4A when the remote copy ceases between the second and the third storage devices 4B and 4C due to an obstacle in the network 6B or a user's indication.

As described in FIG. 6, when the first storage device 4A receives the write command and the write data from the first host computer 3A, it transmits the write command to the second storage device 4B. The second storage device 4B reports occurrence of an obstacle to the first storage device 4A when it stops the remote copy with the third storage device 4C.

The channel adaptor 20 of the first storage device 4A to have received such report of the obstacle occurrence changes into an "obstacle" the pair state stored in the pair state column 31B of the entry corresponding to the copy pair configured of the first logical volume VOL1 and the virtual volume VVOL of the entries in the pair information table 31 (FIG. 4) stored in the share memory 22.

When the channel adaptor 20 connected to the first host computer 3A receives the write command which designates the first logical volume VOL1 as a write destination of data and write data from the first host computer 3A, it stores the write data in the cache memory 23 (the arrow a70 in FIG. 17) and immediately issues a write completion notification to the first host computer 3A (the arrow a71 in FIG. 17).

Thereafter, the channel adaptor 20 sets to on a bit corresponding to a block in the first logical volume VOL1 designated by the write command received at that time, of the bits on a difference bit map (hereinafter, referred to as "primary inter-P/I difference bit map") 51A stored in the share memory 22 (the arrow a73 in FIG. 17). With this, locations in the first logical volume VOL1 updated after stopping of the remote copy between the second storage device 4B and the third storage device 4C are managed by the primary inter-P/I difference bit map 51A.

In addition, the write data stored in the cache memory 23 are read from the cache memory 23 by the disk adaptor 24 in charge of the first logical volume VOL1 and are stored in a designated location in the first logical volume VOL1 by the associated write command (the arrow a74 in FIG. 17).

(3-2) Resynchronization Process

A resynchronization process will now be described. In the present storage system 1, after the network 6B between the second storage device 4B and the third storage device 4C recovers and when the remote copy resumes between the first and the third logical volumes VOL1 and VOL5, a user manipulates the second host computer 3B to transmit a resynchronization command for resynchronization between the second and the third sites 2B and 2C, to the second storage device 4B from the second host computer 3B, as shown in FIG. 28.

Figure 18:
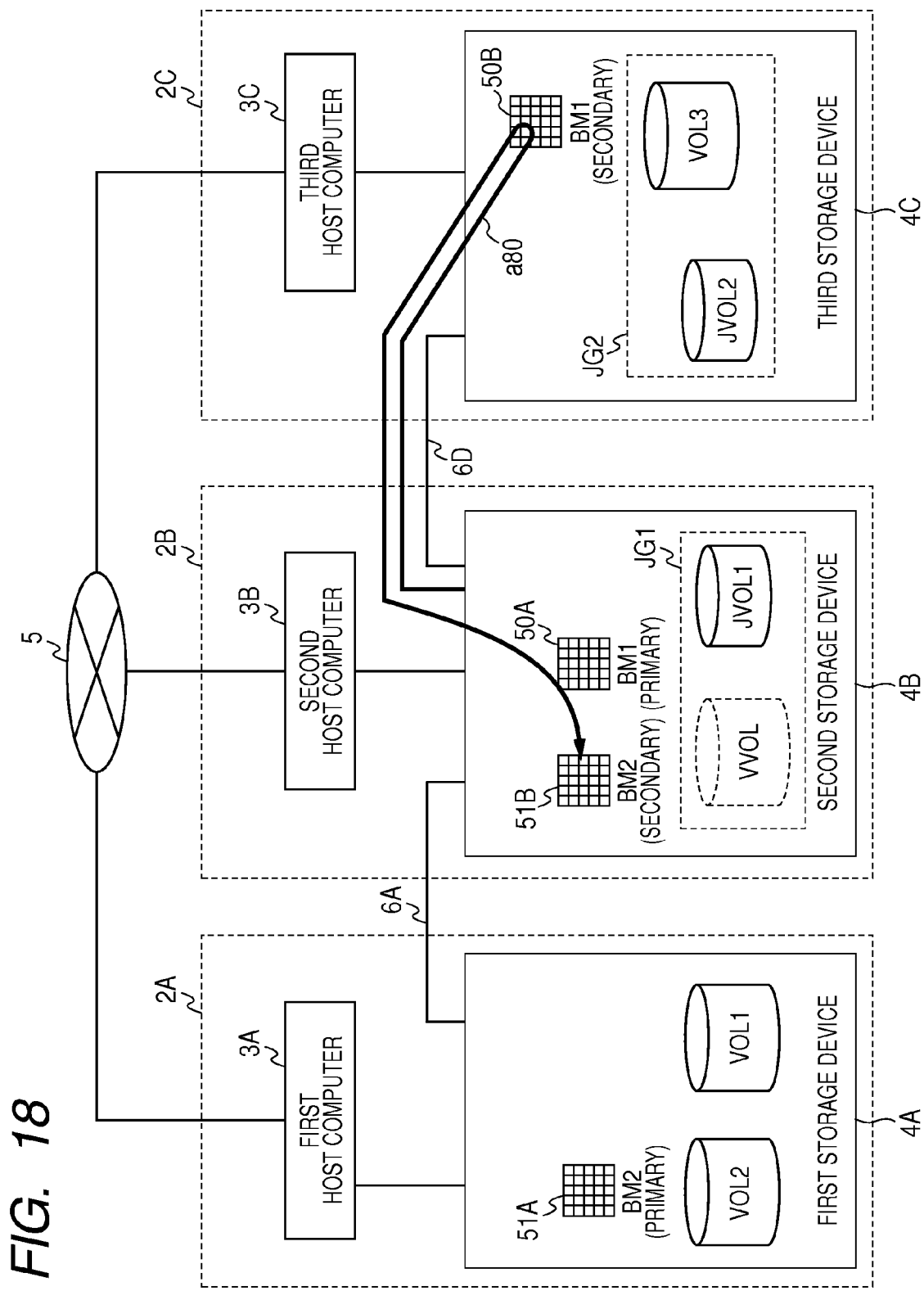
FIG. 18 is a block diagram to be provided for description of the resynchronization process performed in the second and the third storage devices about resynchronization between the second and the third storage devices.
Figure 28:
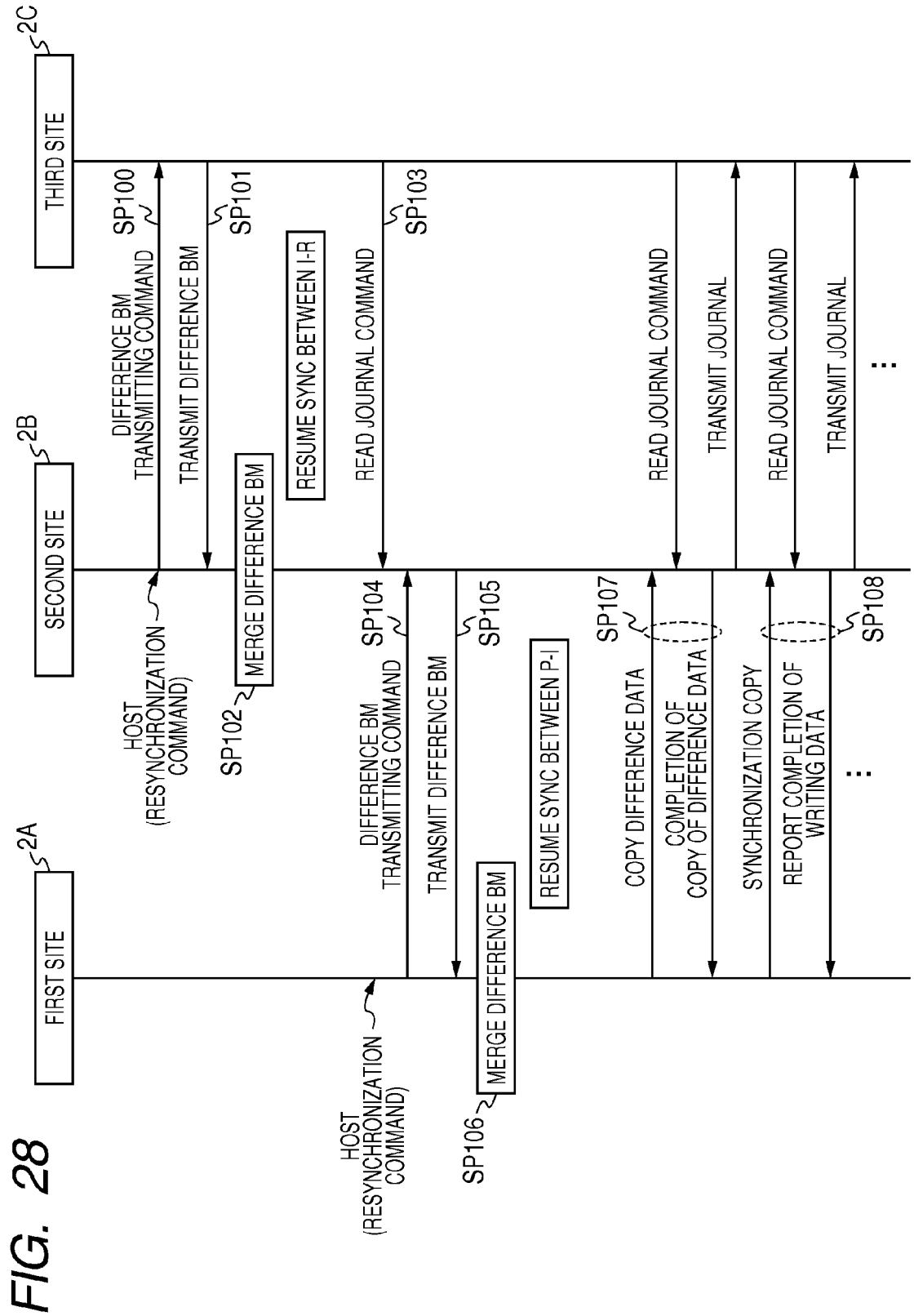
FIG. 28 is a time chart to be provided for description of the resynchronization process performed in the first to the third storage devices about resynchronization among the first to the third storage devices.

The second storage device 4B to have received the resynchronization command transmits a difference bit map transmitting command for transmission of the secondary inter-I/R difference bit map 50B to the third storage device 4C, as shown in FIGS. 28 and 18 (SP100 in FIG. 28). The third storage device 4C to have received the difference bit map transmitting command transmits the secondary inter-I/R difference bit map 50B held in the share memory 22 at that time to the second storage device 4B (SP101 in FIG. 28). In addition, the second storage device 4B to have received the secondary inter-I/R difference bit map 50B merges the secondary inter-I/R difference bit map 50B into the primary inter-P/I difference bit map 51A held in the share memory 22 at that time (SP102 in FIG. 28).

In each of the second and the third storage devices 4B and 4C, the pair state of the copy pair configured of the first and the second journal volume JVOL1 and JVOL2 returns to "synchronization" and thus the read journal command issues again from the third storage device 4C to the second storage device 4B (SP103 in FIG. 28).

Additionally, the user manipulates the first host computer 3A to transmit a resynchronization command for resynchronization between the first and second sites 2A and 2B, to the first storage device 4A from the first host computer 3A, as shown in FIG. 28.

Figure 23:
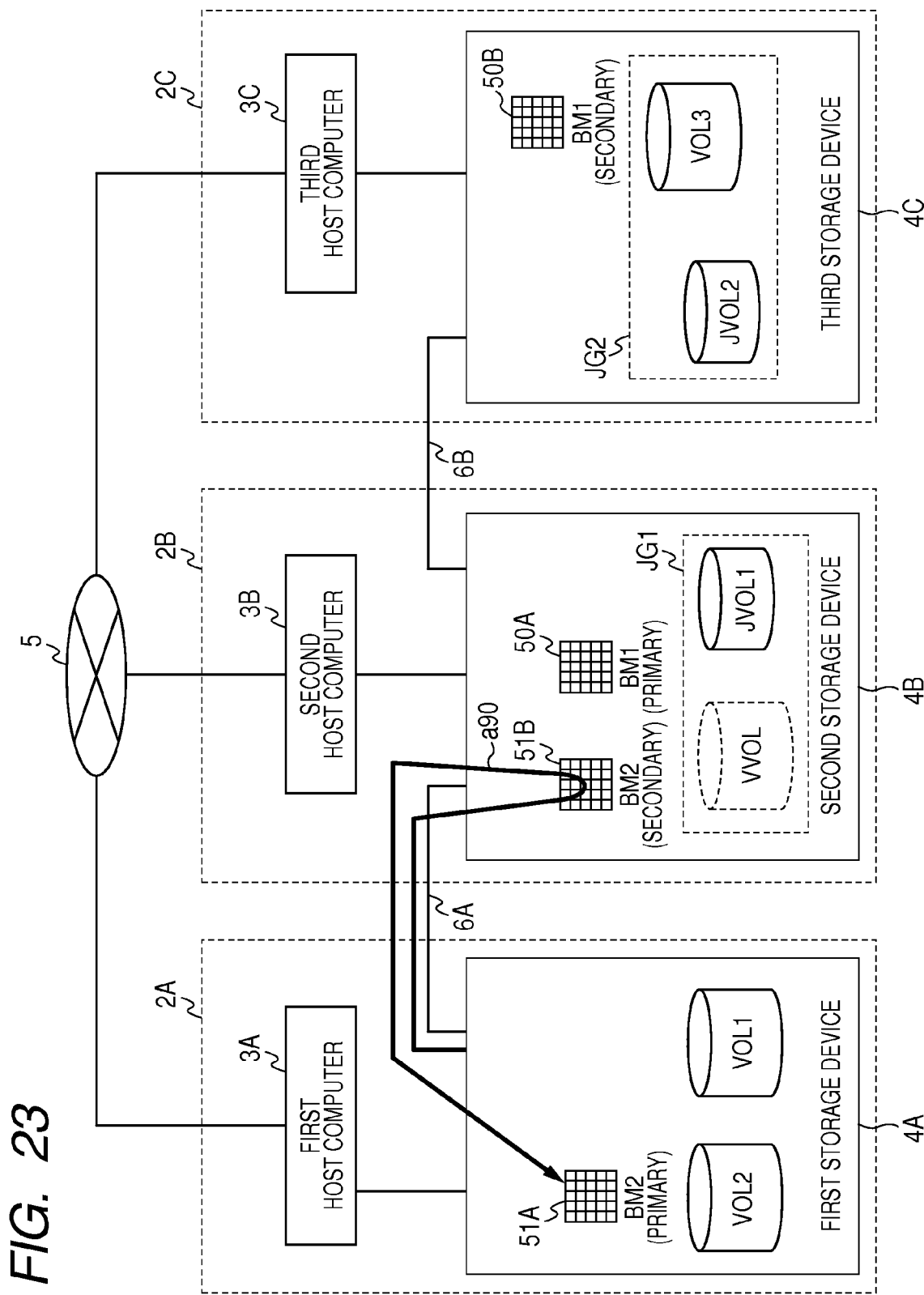
FIG. 23 is a block diagram to be provided for description of the resynchronization process performed in the first and the second storage devices about resynchronization between the first and the second storage devices.

The first storage device 4A to have received the resynchronization command transmits a difference bit map transmitting command for transmission of the secondary inter-P/I difference bit map 51B to the second storage device 4B, as shown in FIGS. 28 and 23 (SP104 in FIG. 28). The second storage device 4B to have received the difference bit map transmitting command transmits the secondary inter-P/I difference bit map 51B held in the share memory 22 at that time to the first storage device 4A (SP105 in FIG. 28). In addition, the first storage device 4A to have received the secondary inter-P/I difference bit map 51B merges the secondary inter-P/I difference bit map 51B into the primary inter-P/I difference bit map 51A held in the share memory 22 at that time (SP106 in FIG. 28).

In each of the first and the second storage devices 4A and 4B, the pair state of the copy pair configured of the first logical volume VOL1 and the virtual volume VVOL returns to "synchronization," and thus what is called a difference copy is performed that the data stored in each block of which the corresponding bit is set to ON in the primary inter-P/I difference bit map 51A, of the blocks in the first logical volume VOL1, are remote-copied between the first storage device 4A and the second storage device 4B (SP107 in FIG. 28).

When the difference copy is completed, the remote copy described in FIGS. 6 and 7 resumes between the first storage device 4A and the second storage device 4B.

Figure 19:
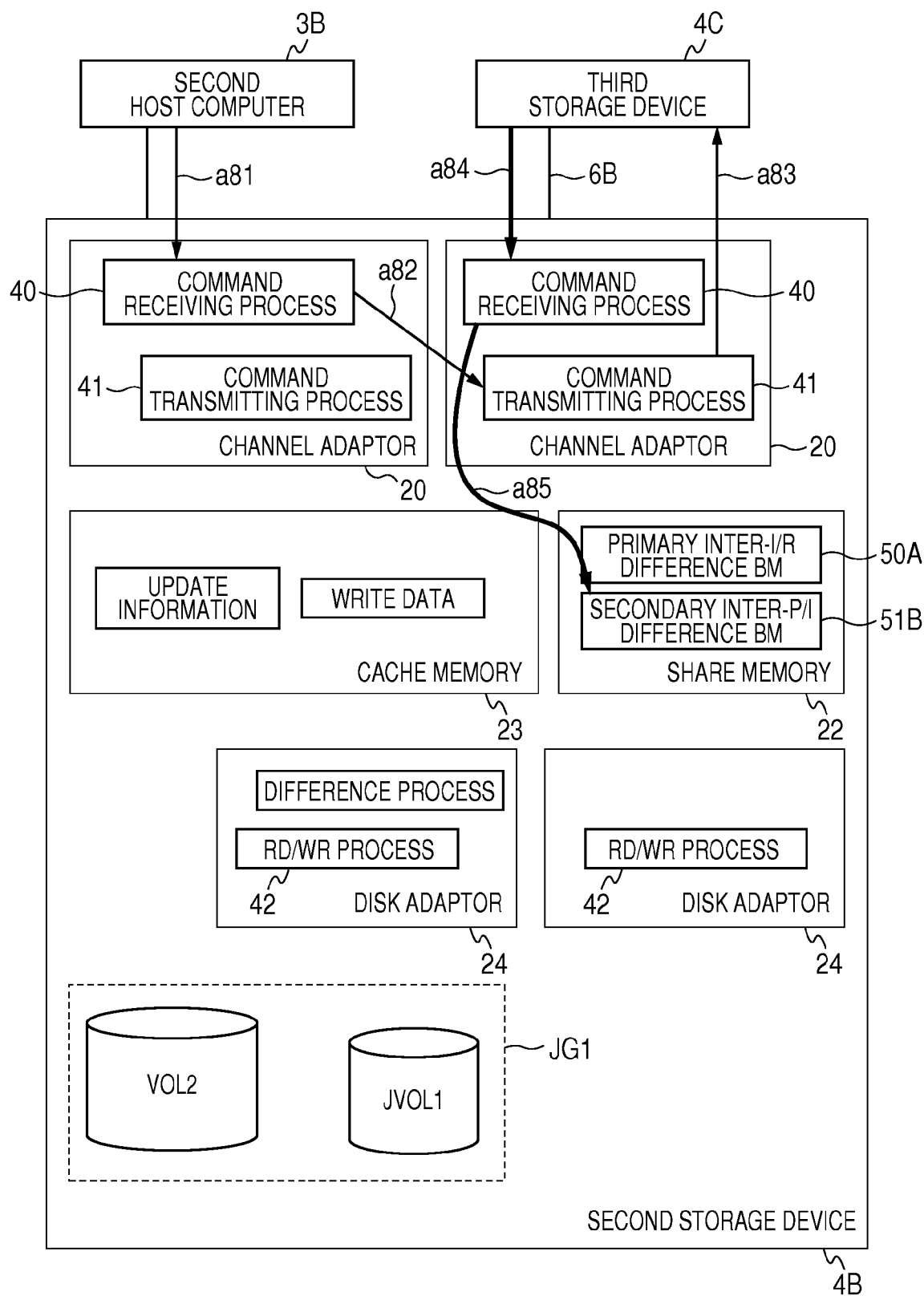
FIG. 19 is a block diagram to be provided for description of the resynchronization process performed in the second storage device about resynchronization between the second and the third storage devices.

Herein, FIG. 19 shows a content of a resynchronization process performed in the second storage device 4B when the resynchronization command is given to the second storage device 4B from the second host computer 3B, of a series of processes described in FIG. 28.

In this case, the channel adaptor 20 of the second storage device 4B to have received the resynchronization command (the arrow a81 in FIG. 19) transmits the resynchronization command to the channel adaptor 20 connected to the third storage device 4C (the arrow a82 in FIG. 19).

In addition, the channel adaptor 20 connected to the third storage device 4C to have received the resynchronization command transmits a transmission command of a difference bit map (hereinafter, referred to as "difference bit map transmitting command") to the third storage device 4C (the arrow a83 in FIG. 19).

Figure 21:
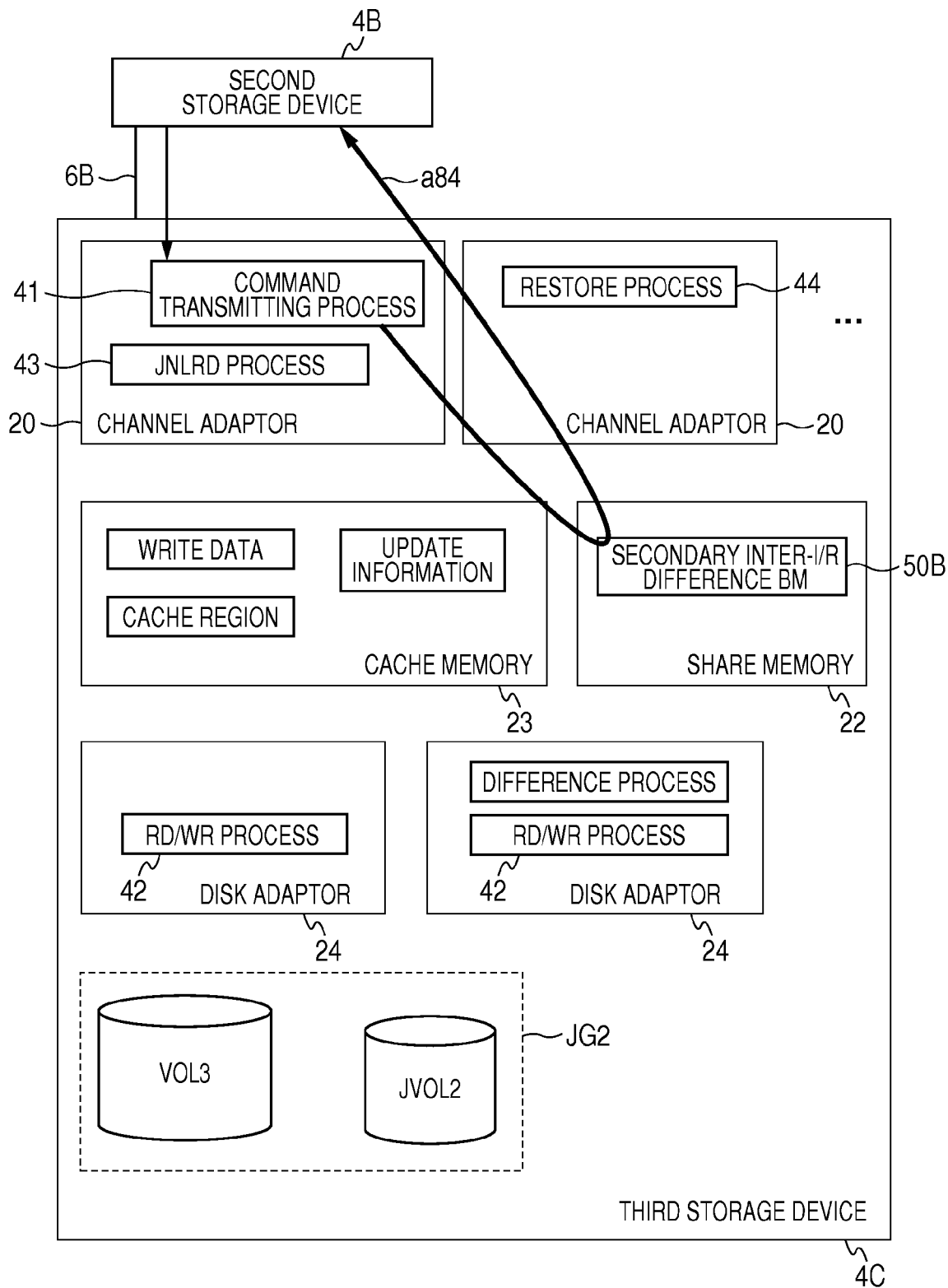
FIG. 21 is a block diagram to be provided for description of the resynchronization process performed in the third storage device about resynchronization between the second and the third storage devices.

The channel adaptor 20 of the third storage device 4C to have received the difference bit map transmitting command, as shown in FIG. 21, reads the secondary inter-I/R difference bit map 50B from the share memory 22 for transmission to the second storage device 4B (the arrow a84 in FIG. 21). Such channel adaptor 20, as shown in FIG. 22, updates the pair state stored in the pair state column 31B of the entry corresponding to the copy pair configured of the first and the second journal volume JVOL1 and JVOL2 of the entries in the pair information table 31 stored in the share memory 22, from the "obstacle" to a "synchronizing".

The channel adaptor 20 of the second storage device 4B to have received such secondary inter-I/R difference bit map 50B merges the corresponding secondary inter-I/R difference bit map 50B into the primary inter-I/R difference bit map 50A prepared in advance on the share memory 22, as shown in FIG. 21. In addition, the channel adaptor 20 then merges the primary inter-I/R difference bit map 50A into the secondary inter-P/I difference bit map 51B held in the share memory 22 (the arrow a85 in FIG. 21).

In detail, such channel adaptor 20 sets each bit on the primary inter-I/R difference bit map 50A, corresponding to each bit set to ON on the secondary inter-I/R difference bit map 50B, to ON. Thereafter, the channel adaptor 20 sets each bit on the secondary inter-P/I difference bit map 51B, corresponding to each bit set to On on the primary inter-I/R difference bit map 50A, to ON.

Subsequently, the channel adaptor 20 connected to the third storage device 4C, as shown in FIG. 20, updates the pair state stored in the pair state column 31B of the entry corresponding to the copy pair configured of the first and the second journal volume JVOL1 and JVOL2 of the entries in the pair information table 31 stored in the share memory 22, from the "obstacle" to an "synchronizing".

Figure 24:
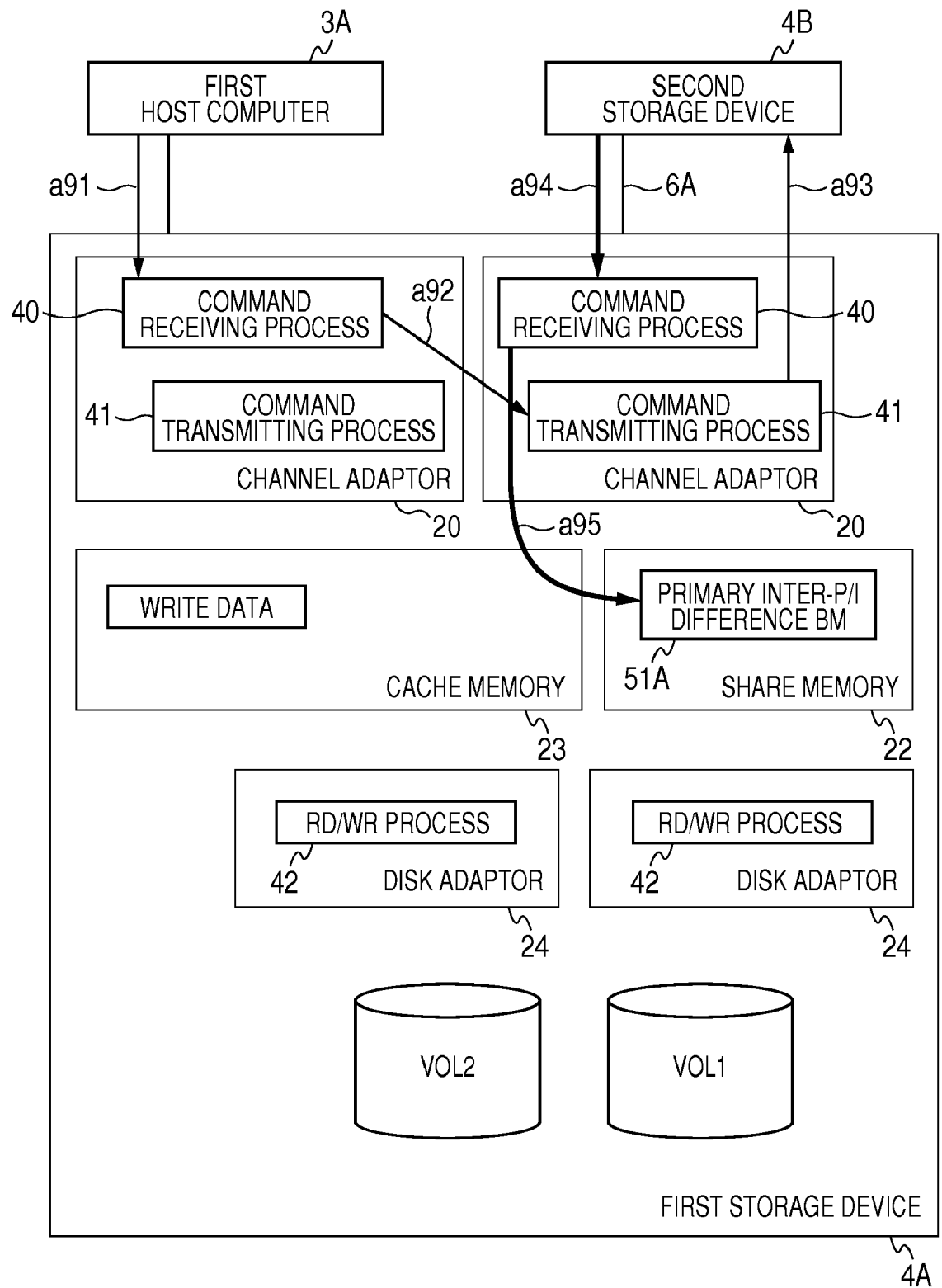
FIG. 24 is a block diagram to be provided for description of the resynchronization process performed in the first storage device about resynchronization between the first and the second storage devices.

FIG. 24 shows a content of a resynchronization process performed in the first storage device 4A when the resynchronization command is given to the first storage device 4A from the first host computer 3A, of a series of processes described in FIG. 28.

In this case, the channel adaptor 20 of the first storage device 4A to have received the resynchronization command (the arrow a91 in FIG. 24) transmits the resynchronization command to the channel adaptor 20 connected to the second storage device 4B (the arrow a92 in FIG. 24).

In addition, the channel adaptor 20 connected to the second storage device 4B to have received the resynchronization command transmits a transmission command of a difference bit map (hereinafter, referred to as "difference bit map transmitting command") to the second storage device 4B (the arrow a93 in FIG. 24).

Figure 26:
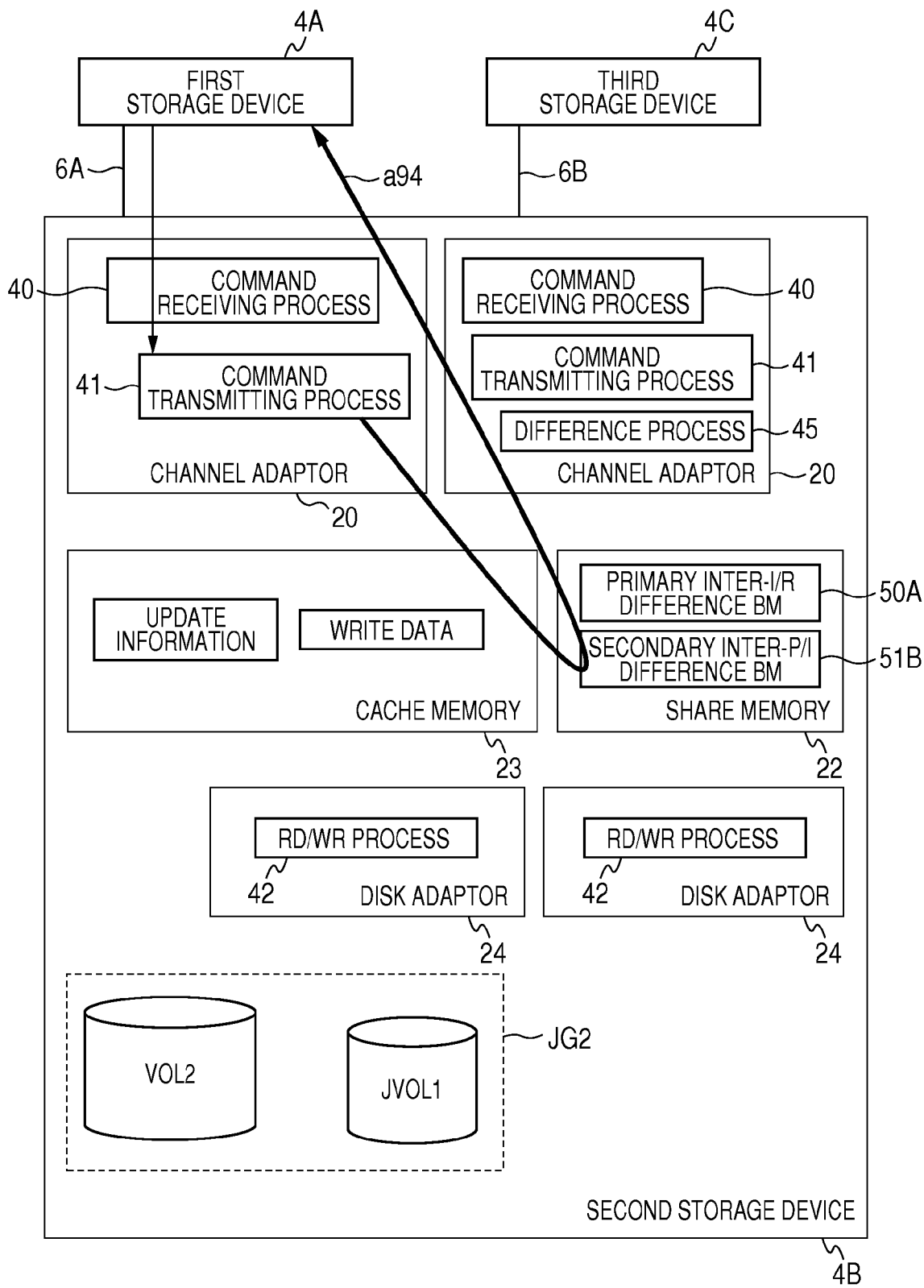
FIG. 26 is a block diagram to be provided for description of the resynchronization process performed in the second storage device about resynchronization between the first and the second storage devices.

The channel adaptor 20 of the second storage device 4B to have received the difference bit map transmitting command, as shown in FIG. 26, reads the secondary inter-P/I difference bit map 51B from the share memory 22 for transmission to the first storage device 4A (the arrow a94 in FIG. 26). Such channel adaptor 20, as shown in FIG. 27, updates the pair state stored in the pair state column 31B of the entry corresponding to the copy pair configured of the first logical volume VOL1 and the virtual volume VVOL of the entries in the pair information table 31 stored in the share memory 22, from the "obstacle" to an "synchronizing".

The channel adaptor 20 of the first storage device 4A to have received such secondary inter-P/I difference bit map 51B merges the corresponding secondary inter-P/I difference bit map 51B into the primary inter-P/I difference bit map 51A, as shown in FIG. 24 (the arrow a95 in FIG. 24). In detail, such channel adaptor 20 sets each bit on the primary inter-P/I difference bit map 51A, corresponding to each bit set to ON on the secondary inter-P/I difference bit map 51B, to ON.

Subsequently, the channel adaptor 20 connected to the third storage device 4C, as shown in FIG. 25, updates the pair state stored in the pair state column 31B of the entry corresponding to the copy pair configured of the first logical volume VOL1 and the virtual volume VVOL of the entries in the pair information table 31 stored in the share memory 22, from the "obstacle" to an "synchronizing".

(4) Process of the Channel Adaptor

A detailed process content performed by the channel adaptors 20 of the first to the third storage devices 4A to 4C to have received commands transmitted from the first to the third host computers 3A to 3C installed in the same site or the first to the third storage devices 4A to 4C connected to self-storage devices, will be described.

(4-1) Command Receiving Process

Figure 29:
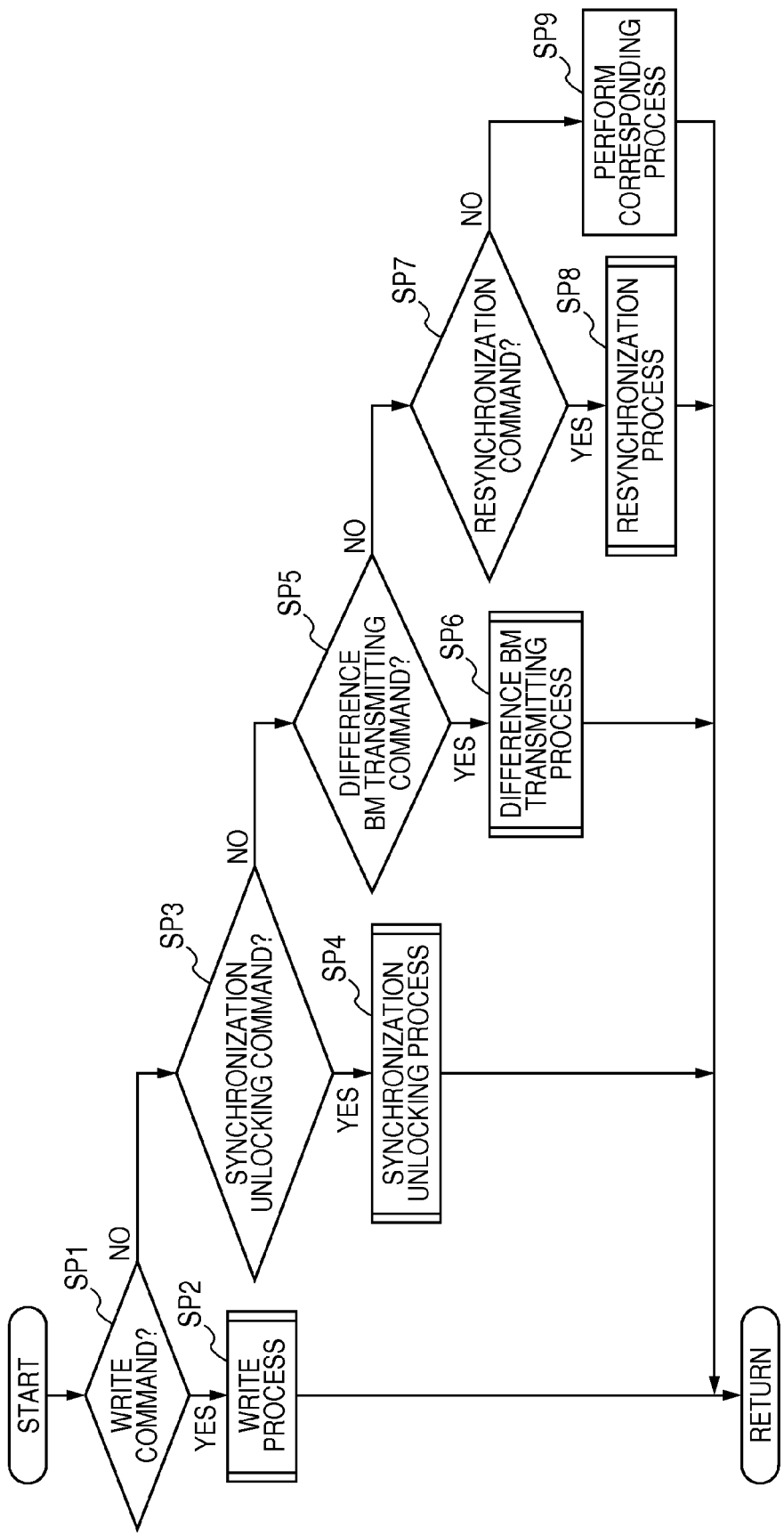
FIG. 29 is a flowchart to represent a process order of the command receiving process.

FIG. 29 shows a process content of a command receiving process performed by the channel adaptors 20 to have received the commands transmitted from the first to the third host computers 3A to 3C installed in the same site or the first to the third storage devices 4A to 4C connected to self-storage devices.

When the channel adaptor 20 receives such command, it begins the command receiving process shown in FIG. 29 to determine whether the command is a write command or not (SP1). If obtaining an affirmative result from the determination, the channel adaptor 20 performs a write process according to the command (write command) (SP2), and then finishes the command receiving process. The write command is receivable by the first and the second storage devices 4A and 4B but is not receivable by the third storage device 4C.

If obtaining a negative result from the determination at the step SP1, the channel adaptor 20 determines whether the command is a synchronization unlocking command or not (SP3). If obtaining an affirmative result from the determination, the channel adaptor 20 performs the synchronization unlocking process for unlocking a synchronization of a copy pair designated by the synchronization unlocking command (SP4), and then finishes the command receiving process. The synchronization unlocking command is a receivable command by the first to the third storage devices 4A to 4C.

If obtaining a negative result from the determination at the step SP3, the channel adaptor 20 determines whether the command is a difference bit map transmitting command (SP5). If obtaining an affirmative result from the determination, the channel adaptor 20 performs a difference bit map transmitting process for transmitting the secondary inter-P/I difference bit map 51B or the secondary inter-I/R difference bit map 50B stored in the share memory 22 in the self-storage device to a transmitting source of the corresponding command (SP6), and then finishes the command receiving process. The difference bit map transmitting command is receivable by the second and the third storage devices 4B and 4C but is not receivable by the first storage device 4A.

On the other hand, if obtaining a negative result from the determination at the step SP5, the channel adaptor 20 determines whether the command is a resynchronization command or not (SP7). If obtaining an affirmative result from the determination, the channel adaptor 20 performs a resynchronization process for resynchronization between the first to third storage devices 4A to 4C designated by the command (the resynchronization command) (SP8), and then finishes the command receiving process. The resynchronization command is receivable by any of the first to the third storage devices 4A to 4C.

If obtaining a negative result from the determination at the step SP7, the channel adaptor 20 performs a process according to the command (SP9), and then finishes the command receiving process.

(4-2) Write Process

Figure 30:
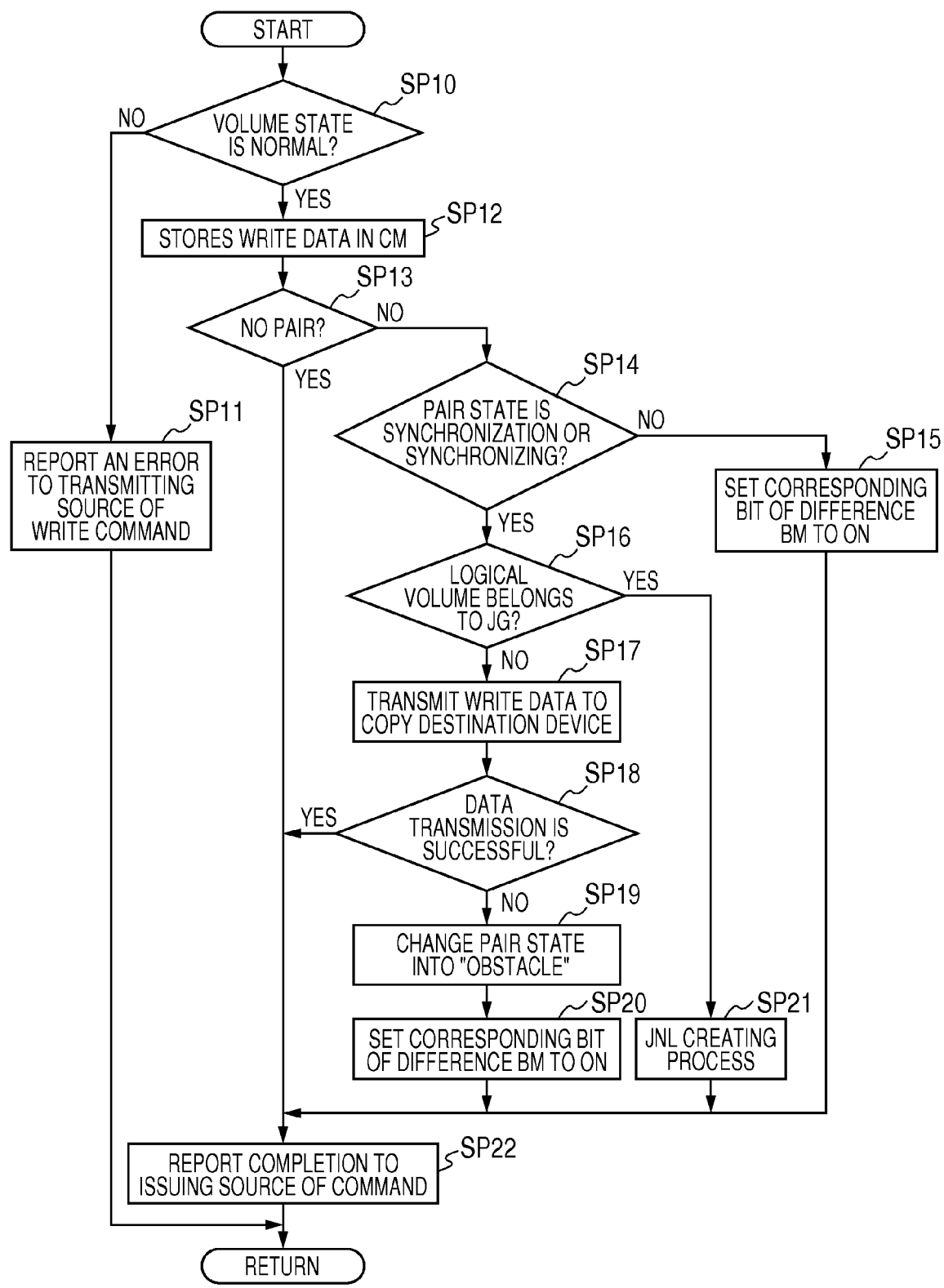
FIG. 30 is a flowchart to represent a process order of the write process.

FIG. 30 shows a detailed process content of a write process performed at the step SP2 of the command receiving process described above. In the present embodiment, this write process is performed in a channel adaptor 20 connected to the first host computer 3A of the channel adaptors 20 of the first storage device 4A or in a channel adaptor 20 connected to the first storage device 4A of the channel adaptors 20 of the second storage device 4B.

The channel adaptor 20 begins the write process upon going to the step SP2 of the command receiving process described in FIG. 29. The channel adaptor 20 first determines whether a state of a logical volume of writing destination of the write data (hereinafter, the logical volume is the first logical volume VOL1 or the virtual volume VVOL, which is referred to as "data writing destination logical volume.") designated by the write command is normal or not (SP10), referring to the volume information table 30 (FIG. 3) stored in the share memory 22.

If obtaining a negative result from the determination, the channel adaptor 20 reports the abnormal state to a transmitting source of the write command (the first host computer 3A or the first storage device 4A)(SP11) and then finishes the write process to go back to the command receiving process in FIG. 29.

As compared therewith, if obtaining an affirmative result from the determination at the step SP10, the channel adaptor 20 stores the write data together with the write command transmitted from the transmitting source of the command in the cache memory 23 (SP12).

Successively, the channel adaptor 20 determines whether the data writing destination logical volume designated by the write command is set as a copy pair of another logical volume or not, referring to the pair information table 31 (FIG. 4) stored in the share memory 22 (SP13).

If obtaining an affirmative result from the determination, the channel adaptor 20 reports completion of writing process of the write data to the transmitting source of the write command (SP20) and then finishes the write process to go back to the command receiving process in FIG. 29. In addition, the write data stored in the cache memory 23 at this time are read by the corresponding disk adaptor 24 and are written in an address location designated by the above-described write command of a logical volume designated by the corresponding write command.

If obtaining a negative result from the determination at the step SP13, the channel adaptor 20 determines whether a pair state of the copy pair configured of the data writing destination logical volume is "synchronization" or "synchronizing", based on the pair information table 31 (SP14).

A negative result in the determination at this step means the pair state of the copy pair is "obstacle." However, since the first storage device 4A does not transmit the write command to the second storage device 4B after the pair state of the copy pair configured of the first logical volume VOL1 and the virtual volume VVOL becomes "obstacle," only the channel adaptors 20 of the first storage device 4A obtains such negative result in the determination at this step.

The channel adaptor 20 sets a bit corresponding to a block of the data writing destination designated by the write command received at that time, of the bits on the primary inter-P/I difference bit map 51A stored in the share memory 22, to ON (SP21). The channel adaptor 20 reports completion of the writing process of data to the transmitting source of the write command (herein, the first host computer 3A) (SP22), and then finishes the write process to go back to the command receiving process in FIG. 29.

On the other hand, if the channel adaptor 20 obtains an affirmative result in the determination at the step SP14, it determines whether the data writing destination logical volume belongs to any one of the journal groups set in the self-storage device (SP16).

Herein, if the channel adaptor 20 belongs to the first storage device 4A, the channel adaptor 20 obtains a negative result in the determination at the step SP15. In this case, the channel adaptor 20 transmits the write data transmitted from the first host computer 3A to the second storage device 4B (SP17), and then determines whether the transmission of the write data is successful or not, based on a response or not from the second storage device 4B (SP18).

If the channel adaptor 20 obtains an affirmative result in this determination, it reports completion of the writing process of data to the transmitting source of the write command (herein, the first host computer 3A) (SP22), and then finishes the write process to go back to the command receiving process in FIG. 29.

On the contrary, if the channel adaptor 20 obtains a negative result in the determination at the step SP17, it changes the pair state of the copy pair stored in the pair state column 31B (FIG. 4) of the entry corresponding to the pair information table 31 into "obstacle." (SP18)

The channel adaptor 20 sets a bit corresponding to a block designated by the write command in a logical volume (the first logical volume VOL1) designated by the write command, of the bits on the primary inter-P/I difference bit map 51A stored in the share memory 22, to ON (SP19).

The channel adaptor 20 reports completion of the writing process of data to the transmitting source of the write command (herein, the first host computer 3A) (SP22), and then finishes the write process to go back to the command receiving process in FIG. 29.

If the channel adaptor 20 belongs to the second storage device 4B, the corresponding channel adaptor 20 obtains an affirmative result in the determination at the step S16. At this time, the channel adaptor 20 creates a update history about the write data stored in the cache memory 23 at the step SP12 and then stores it in the cache memory 23 (SP20). The update information created at this time is written in the first journal volume JVOL1 as a journal by the corresponding disk adaptor 24, together with the corresponding write data written in the cache memory 23 at the step SP12.

(4-3) Synchronization Unlocking Process

Figure 31:
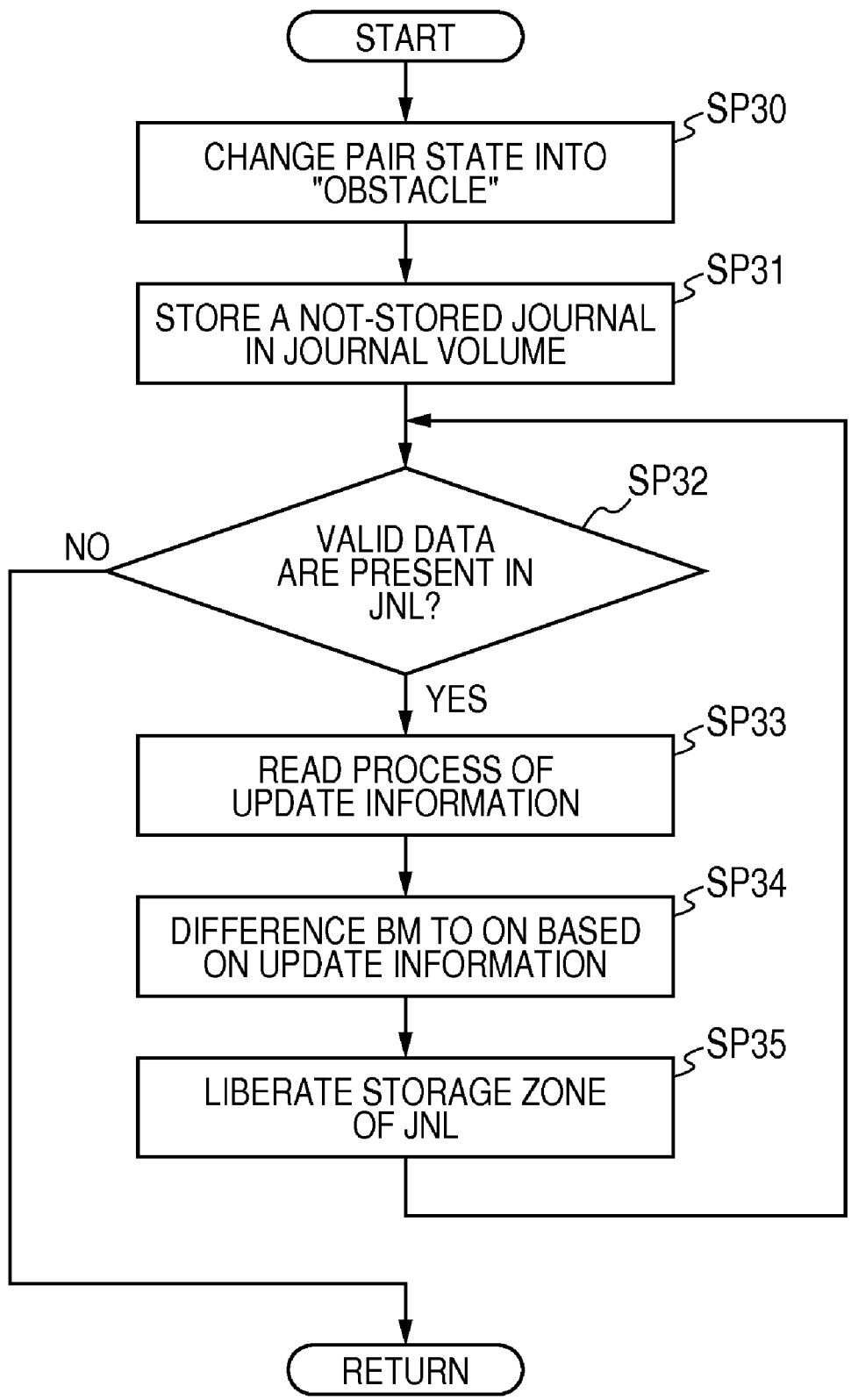
FIG. 31 is a flowchart to represent a process order of the synchronization unlocking process.

FIG. 31 shows a detailed process content of the synchronization unlocking process performed at the step SP4 of the above-described command receiving process. In this embodiment, this synchronization unlocking process is performed in a channel adaptor 20 connected to the first storage device 4A of the channel adaptors 20 of the second storage device 4B, or in a channel adaptor 20 connected to the second storage device 4B of the channel adaptors 20 of the third storage device 4C.

Such channel adaptor 20 begins the synchronization unlocking process upon going to the step SP4 of the command receiving process described in FIG. 29, and then changes a pair state stored in the pair state column 31B of the entry corresponding to the copy pair of the synchronization unlocking object designated by the synchronization unlocking command, of the entries of the pair information table 31 (FIG. 4), into "obstacle." (SP30).

Subsequently, if journals (write data and update information thereof) not stored in the first and the second journal volumes JVOL1 and JVOL2 are present on the cache memory 23, the channel adaptor 20 controls the corresponding disk adaptor 24 to store the corresponding journal in the first journal volume JVOL1 or the second journal volume JVOL2 (SP31).

Thereafter, the channel adaptor 20 determines whether journals not transmitted to the third storage device 4C or not reflected to the third logical volume VOL3, in the first journal volume JVOL1 or in the second journal volume JVOL2 in the self-storage device, are present or not (SP32).

If obtaining a negative result in this determination, the channel adaptor 20 controls the corresponding disk adaptor 24 to read update information in one journal of the journals stored in the first or the second journal volumes JVOL1 or JVOL2 from the cache memory 23 (SP33).

The channel adaptor 20 sets a bit corresponding to a block in the third logical volume VOL3 to which the journal, from which the update information is read at the step SP33, is reflected, of the bits on the secondary inter-P/I difference bit map 51B or on the secondary inter-I/R difference bit map 50B stored in the share memory 22, based on the update information read by the disk adaptor 24 at this time, to ON (SP34).

Moreover, the channel adaptor 20 liberates the storage zone storing the journal in the first or the second journal volume JVOL1 or JVOL2 (SP35). This eliminates the journal from the first or the second journal volume JVOL1 or JVOL2.

Thereafter, the channel adaptor 20 repeats the processes of the steps SP32 to SP35 until obtaining a negative result at the step SP32. With this, each bit on the secondary inter-P/I difference bit map 51B or on the secondary inter-I/R difference bit map 50B corresponding to each address location in the third logical volume VOL3 to be updated by the journals stored in the first or the second journal volume JVOL1 or JVOL2 at that time, is set to ON one by one.

At last, if the channel adaptor 20 obtains a negative result in the determination at the step SP32 by performing the above-described processes for all of the journals stored in the first or the second journal volume JVOL1 or JVOL2, it finishes the synchronization unlocking process to go back to the command receiving process in FIG. 29.

(4-4) Difference Bit Map Transmitting Process

Figure 32:
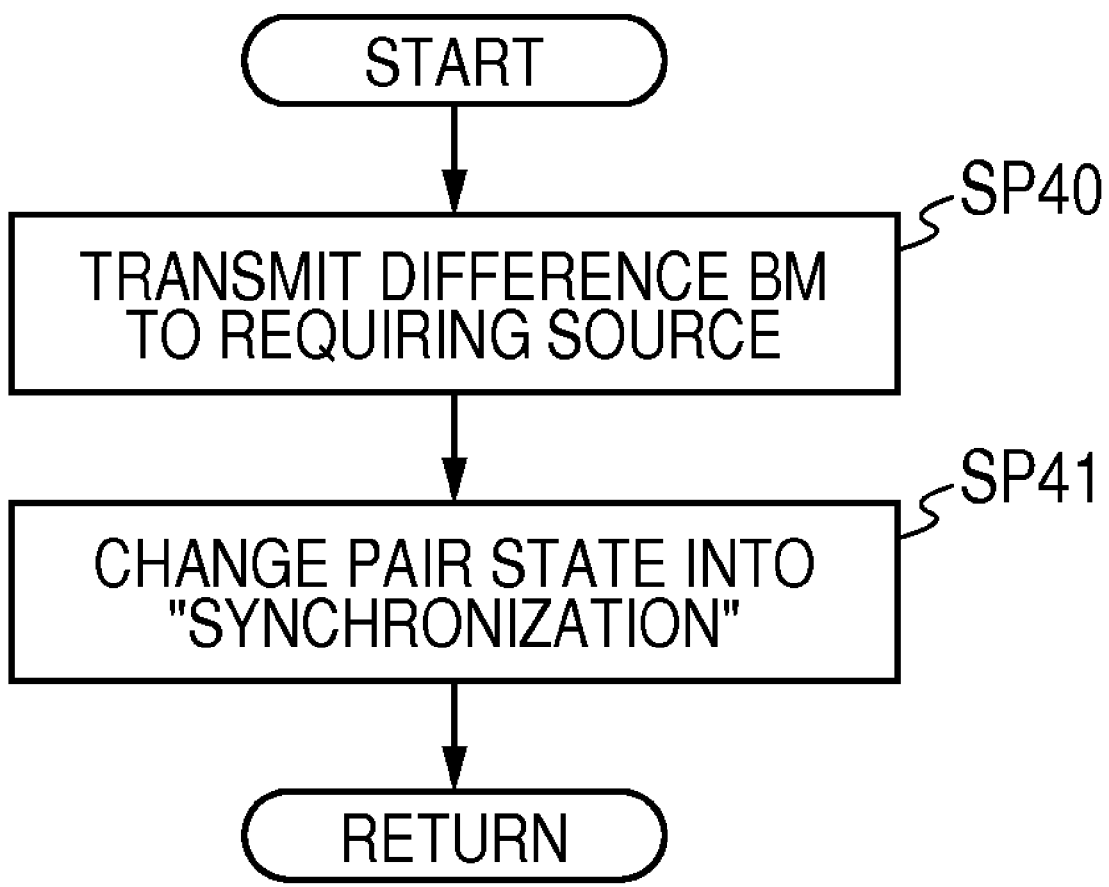
FIG. 32 is a flowchart to represent a process order of the difference bit map transmitting process.

FIG. 32 shows a detailed process content of the difference bit map transmitting process performed at the step SP6 of the above-described command receiving process. In the present embodiment, this difference bit map transmitting process is performed in a channel adaptor 20 connected to the first storage device 4A of the channel adaptors 20 of the second storage device 4B or in a channel adaptor 20 connected to the second storage device 4B of the channel adaptors 20 of the third storage device 4C.

Such channel adaptor 20 begins the difference bit map transmitting process shown in FIG. 32 upon going to the step SP6 of the command receiving process described in FIG. 29. The channel adaptor 20 reads the secondary inter-P/I difference bit map 51B or the secondary inter-I/R difference bit map 50B from the share memory 22 for transmission to the transmitting source of the difference bit map transmitting command (the first or the second storage device 4A or 4B) (SP40).

Then, the channel adaptor 20 changes a pair state (if the channel adaptor 20 belongs to the second storage device 4B) stored in the pair state column 31B of an entry corresponding to the copy pair configured of the first logical volume VOL1 and the virtual volume VVOL of the entries of the pair information table 31 (FIG. 4) stored in the share memory 22, or a pair state (if the channel adaptor 20 belongs to the third storage device 4C) stored in the pair state column 31B of an entry corresponding to the copy pair configured of the first and the second journal volumes JVOL1 and JVOL2 of the entries of the pair information table 31 (FIG. 4), into "synchronization" (SP41).

The channel adaptor 20 finishes the difference bit map transmitting process and then goes back to the command receiving process described in FIG. 29.

(4-5) Resynchronization Process

Figure 33:
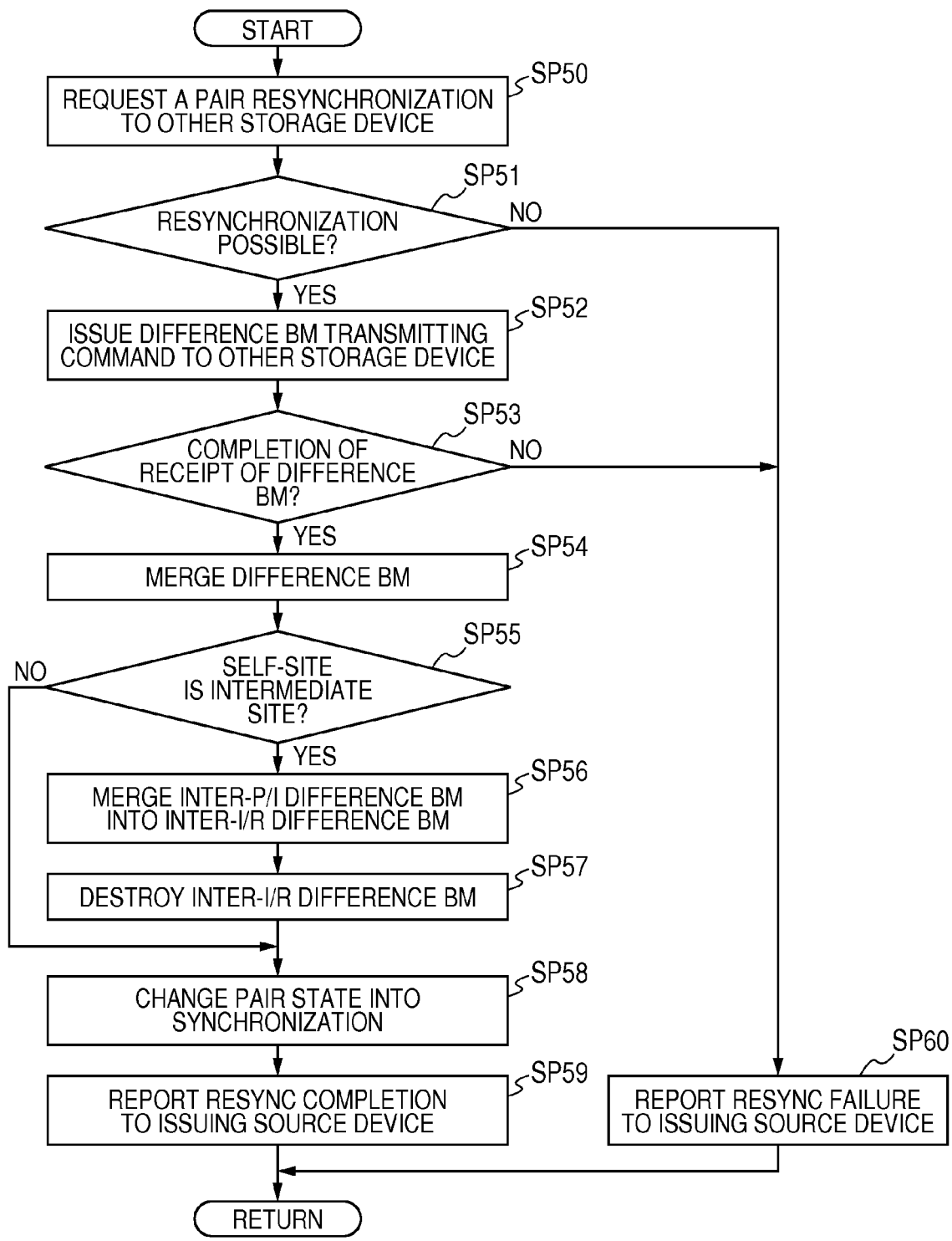
FIG. 33 is a flowchart to represent a process order of the resynchronization process.

FIG. 33 shows a detailed process content of the resynchronization process performed at the step SP8 of the above-described command receiving process. In the present embodiment, this resynchronization process is performed in a channel adaptor 20 connected to the second storage device 4B of the channel adaptors 20 of the first storage device 4A or in a channel adaptor 20 connected to the third storage device 4C of the channel adaptors 20 of the second storage device 4B.

Such channel adaptor 20 begins the resynchronization process upon going to the step SP8 of the command receiving process described in FIG. 29. The channel adaptor 20 transmits a pair resynchronizing request for requesting a resynchronization of the copy pair configured of the first logical volume VOL1 and the virtual volume VVOL (if the channel adaptor 20 belongs to the first storage device 4A) or of the copy pair configured of the first and the second journal volumes JVOL1 and JVOL2 (if the channel adaptor 20 belongs to the second storage device 4B), to the other storage device (it is the second storage device 4B if the channel adaptor 20 belongs to the first storage device 4A, and it is the third storage device 4C if the channel adaptor 20 belongs to the second storage device 4B) (SP50).

The channel adaptor 20 determines whether a resynchronization of such copy pair is possible or not, based on a response or not from the other storage device or a content of the response or the like (SP51). If obtaining a negative result from the determination, the channel adaptor 20 reports a failure of resynchronization to the first or the second host computer 3A or 3B of an issuing source of the resynchronization command (SP60), and then finishes the resynchronization process to go back to the command receiving process described in FIG. 29.

If obtaining an affirmative result from the determination at the step SP51, the channel adaptor 20 issues the difference bit map transmitting request to the other storage device (SP52) and then determines whether the difference bit map (the secondary inter-P/I difference bit map 51B or the secondary inter-I/R difference bit map 50B) is transmitted from the other storage device or not (SP53).

If obtaining a negative result from such determination, the channel adaptor 20 goes to the step SP60, and, herein, if obtaining an affirmative result, it merges the difference bit map acquired at that time into the primary inter-P/I difference bit map 51A or into the primary inter-I/R difference bit map 50A held in the share memory 22 of the self-storage device (SP54).

Subsequently, the channel adaptor 20 determines whether a site where the self-storage device is installed is an intermediate site (the second site 2B) or not (SP55).

A negative result from this determination means that the channel adaptor 20 belongs to the first storage device 4A. At this time, the channel adaptor 20 goes to the step SP58.

On the contrary, an affirmative result from the determination at the step SP55 means that the channel adaptor 20 belongs to the second storage device 4B. At this time, the channel adaptor 20 merges the primary inter-I/R difference bit map 50A stored in the share memory 22 into the secondary inter-P/I difference bit map 51B (SP56), and then destroys the primary inter-I/R difference bit map 50A (SP57)

Thereafter, the channel adaptor 20 changes a pair state stored in the pair state column 31B of an entry corresponding to the copy pair as an object at that time, of the entries of the pair information table 31 (FIG. 4) stored in the share memory 22, into "synchronization." (SP58).

The channel adaptor 20 reports completion of resynchronization to the first host computer 3A or the second host computer 3B of the issuing source of the resynchronization command (SP59), and then finishes the resynchronization process to go back to the command receiving process described in FIG. 29.

(4-6) Pair State Checking Process in the Second Storage Device 4B

Figure 34:
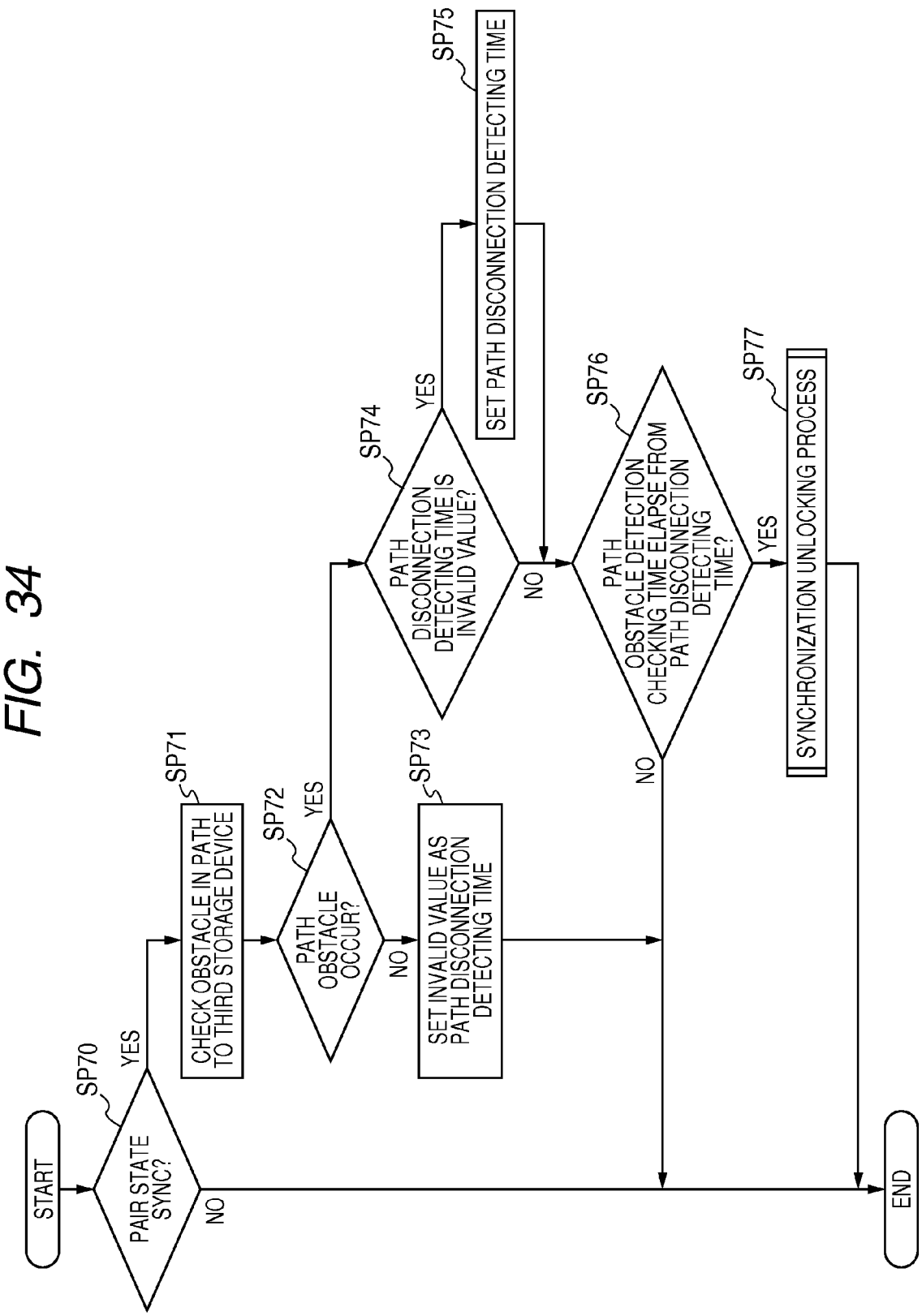
FIG. 34 is a flowchart to represent a process order of the pair state checking process.

Meanwhile, a channel adaptor 20 connected to the third storage device 4C of the channel adaptors 20 of the second storage device 4B checks a pair state of the copy pair configured of the first and the second journal volumes JVOL1 and JVOL2 by periodically executing the pair state managing process shown in FIG. 34, with the command receiving process described above in FIGS. 29 to 33.

Such channel adaptor 20 begins the pair state managing process shown in FIG. 34 periodically. The channel adaptor 20 determines whether or not the pair state of the copy pair configured of the first and the second journal volumes JVOL1 and JOVL2 is "synchronization" (whether or not the journal stored in the first journal volume JVOL1 is normally transmitted to the second journal volume JVOL2), based on the pair information table 31 (FIG. 4) stored in the share memory 22 (SP70).

If obtaining a negative result from this determination, the channel adaptor 20 finishes such pair state managing process. On the contrary, if obtaining an affirmative result from this determination, channel adaptor 20 checks whether an obstacle is occurring in the network 6B between the third storage device 4C and itself (SP71). In detail, the channel adaptor 20 transmits a signal for check to the third storage device 4C and then checks a response or not for the signal for check.

The channel adaptor 20 determines whether an obstacle is occurring or not in the network 6B, based on a check result at the step SP71 (SP72).

If obtaining a negative result from this determination, the channel adaptor 20 stores an invalid value (0) as a path disconnection detecting time, in the path disconnection detecting time column 32E of an entry corresponding to the journal group JG1 to which the first journal volume JVOL1 belongs, of the entries of the journal group setting information table 32 (FIG. 5) (SP73), and then finishes the pair state managing process.

On the contrary, if obtaining an affirmative result from the determination at the step SP72, the channel adaptor 20 determines whether the path disconnection detecting time set in the path disconnection detecting time column 32E is an invalid value (0) or not (SP74). In this case, if obtaining an affirmative result from this determination, the channel adaptor 20 stores a current time in the path disconnection detecting time column 32E (SP75), and then goes to the step SP66.

In contrast, if obtaining a negative result from the determination at the step SP74, the channel adaptor 20 reads a path obstacle detection checking time stored in the path obstacle detection checking time column 32D of an entry corresponding to the journal group JG1 to which the first journal volume JVOL1 belongs, of the entries of the journal group setting information table 32, and then determines whether or not the corresponding path obstacle detection checking time elapsed from transmitting of a signal for check to the third storage device 4C in the step SP71 (SP76).

If obtaining a negative result from this determination, the channel adaptor 20 finishes such pair state managing process. In contrast, if obtaining an affirmative result from this determination, the channel adaptor 20 performs the synchronization unlocking process described above in FIG. 31 (SP77), and then finishes such pair state managing process.

(4-7) Pair State Managing Process in the Third Storage Device 4C

Figure 35:
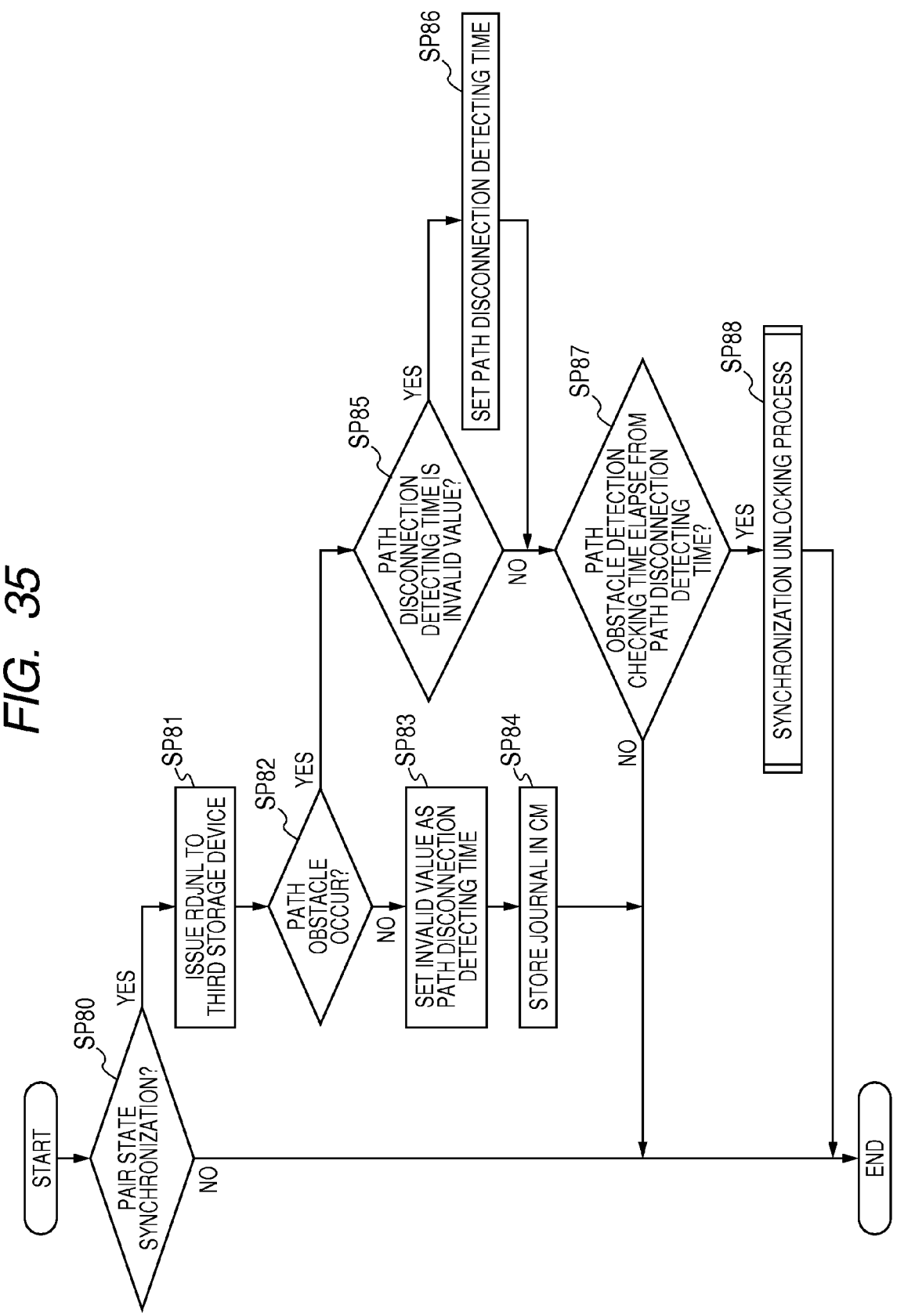
FIG. 35 is a flowchart to represent a process order of the journal reading process.

On the other hand, FIG. 35 shows a process content of the read journal process performed by a channel adaptor 20 connected to the second storage device 4B of the channel adaptors 20 of the third storage device 4C. Such channel adaptor 20 performs the read journal process shown in FIG. 35 at the time of issuing the read journal command to the second storage device 4B, carrying out the command receiving process described above in FIGS. 29 to 33.

In other words, such channel adaptor 20 begins the read journal process at the time of issuing the read journal command to the second storage device 4B. The channel adaptor 20, referring to the pair information table 31 (FIG. 4) stored in the share memory 22, determines whether or not a pair state of the copy pair configured of the first and the second journal volumes JVOL1 and JVOL2 is "synchronization" (whether or not the journal stored in the first journal volume JVOL1 is normally transmitted to the second journal volume JVOL2) (SP80).

If obtaining a negative result from this determination, the channel adaptor 20 finishes such read journal process. In contrast, if obtaining an affirmative result from this determination, the channel adaptor 20 transmits the read journal command to the second storage device 4B (SP81).

Thereafter, the channel adaptor 20 determines whether an obstacle is occurring in the network 6B connecting the second storage device 4B and the third storage device 4C, based on a response or not from the second storage device 4B for the read journal command (SP82).

If obtaining a negative result from this determination (that is, if a journal is transmitted from the second storage device 4B in response to such read journal command), the channel adaptor 20 stores an invalid value (0) as a path disconnection detecting time, in the path disconnection detecting time column 32E of an entry corresponding to the journal group JG2 to which the second journal volume JVOL2 belongs, of the entries of the journal group setting information table 32 (FIG. 5) (SP83). Successively, the channel adaptor 20 stores the journal acquired at that time in the cache memory 23 and then finishes such read journal process.

In contrast, if obtaining an affirmative result from the determination at the step SP82, the channel adaptor 20 processes the steps SP85 to SP88 in the same manner as the steps SP74 to SP77 of the pair state managing process described above in FIG. 34, and then finishes such read journal process.

(5) Effect of the Present Embodiments

As above, in the storage system 1 according to the present embodiments, since, upon stopping of the remote copy among the first to the third storage devices 4A to 4C, the respective second and the third storage devices 4B and 4C manage locations in the third logical volume VOL3 where the data held thereby are to be written, and, upon transmitting of the data again, the respective second and the third storage devices 4B and 4C aggregate the locations in the third logical volume VOL3 managed thereby, the data to be written in the respective aggregated locations in the third logical volume VOL3 being transmitted from the first storage device 4A to the third storage device 4C via the second storage device 4B, just a difference between the first logical volume VOL1 and the third logical volume VOL3 is copied at the time of transmitting of the data again among the first to the third storage devices 4A to 4C.

Therefore, the present storage system 1 can recover a remote copy into a normal state at a very short time, compared with a conventional method of copying all of the data in the first logical volume VOL1 to the third logical volume VOL3.

(6) Other Embodiments

Although, in the above-described embodiments, a case that the present invention is applied to the storage system 1 having the second site 2B of only one has been described, the present invention is not limited thereto; the present invention is also applicable to a storage system in which the second sites 2B are installed in plural and the second storage devices 4B installed in the respective second sites 2B are connected in a cascade.

In addition, although a case that a logical volume of the second storage device 4B set as a copy pair of the first logical volume VOL1 of the first storage device 4A is the virtual volume VVOL has been described in the above-described embodiments, the present invention is not limited thereto; a logical volume VOL1 with substance may be adopted instead of such virtual volume VVOL.

What is claimed is:

1. A storage system comprising:
a first storage device, configured to be installed in a first site, including a first adapter and a first cache memory and providing a primary logical volume in which data received from a host computer via the first adapter and the first cache memory is written;
a second storage device, configured to be installed in a second site, including a second adapter and a second cache memory and providing a virtual logical volume, which has no structure for storing data received from the first storage system via the second adapter and the second cache memory; and
a third storage device, configured to be installed in a third site, including a third adapter and a third cache memory and providing a secondary logical volume in which data received from the second storage system via the third adapter and the third cache memory is written,
wherein data written in the primary logical volume of the first storage device are remote-copied to the secondary logical volume of the third storage device via the virtual logical volume of the second storage device,
wherein, when the second storage device detects a failure by which the remote-copy between the second storage device and the third storage device is stooped, the second storage device sends a notification of the failure to the first storage device, and the first storage device, on the receipt of the notification from the second storage device, stops transmitting data written in the primary logical volume to the virtual logical volume of the second storage device, and each of the first storage device, the second storage device and the third storage device manages an address location of each of one or more data, each of the one or more data being held by the respective storage device as data to be remote-copied/written to the secondary logical volume of the third storage device, and
wherein, when the storage system resumes the remote-copy from the primary logical volume of the first storage device to the secondary logical volume of the third storage device via the virtual logical volume of the second storage device, a plurality of the address locations managed by the first storage device, the second storage device, and the third storage device are aggregated, and data corresponding to each of the aggregated address locations is transmitted from the primary logical volume of the first storage device to the secondary logical volume of the third storage device via the virtual logical volume of the second storage device.

2. The storage system according to claim 1, wherein the storage system stops the remote-copy between the second storage device and the third storage device based on a failure on a network between the second storage device and the third storage device.

3. The storage system according to claim 1, wherein each of the first storage device, the second storage device, and the third storage device manages the address location of each of one or more data by using a bitmap.

4. The storage system according to claim 1, wherein the address location managed by the first storage device and an aggregated address location between the second storage device and the third storage device are aggregated in the first storage device after a plurality of address locations managed by the second storage device and the third storage device are aggregated in the second storage device.

5. The storage system according to claim 1, wherein data written in the primary logical volume of the first storage device are remote-copied to the secondary logical volume of the third storage device via the virtual logical volume of the second storage device and a journal volume of the second storage device.

6. The storage system according to claim 1, wherein the second storage device manages the address location by using a journal volume of the second storage device.

7. A remote copy recovery method in a storage system comprising:
a first storage device, configured to be installed in a first site, including a first adapter and a first cache memory and providing a primary logical volume in which data received from a host computer via the first adapter and the first cache memory is written;
a second storage device, configured to be installed in a second site, including a second adapter and a second cache memory and providing a virtual logical volume, which has no structure for storing data received from the first storage system via the second adapter and the second cache memory; and
a third storage device, configured to be installed in a third site, including a third adapter and a third cache memory and providing a secondary logical volume in which data received from the second storage system via the third adapter and the third cache memory is written,
wherein data written in the primary logical volume of the first storage device are remote-copied to the secondary logical volume of the third storage device via the virtual logical volume of the second storage device,
the method comprising the steps of:
detecting, by the second storage device, a failure by which the remote-copy between the second storage device and the third storage device is stopped, and sending a notification of the failure to the first storage device,
stopping, by the first storage device, data transfer of data written in the primary logical volume to the virtual logical volume of the second storage device, when the first storage device receives the notification from the second storage device
managing, by each of the first storage device, the second storage device and the third storage device, an address location of each of one or more data, each of the one or more data being held by the respective storage device as data to be remote-copied/written in the secondary logical volume of the third storage device, when the first storage device stops the data transfer of the data written in the primary logical volume to the virtual logical volume of the second storage device; and
aggregating a plurality of the address locations managed by the first storage device, the second storage device, and the third storage device and transmitting data corresponding to each of the aggregated address locations from the primary logical volume of the first storage device to the secondary logical volume of the third storage device via the virtual logical volume of the second storage device, when the storage system resumes the remote-copy from the primary logical volume of the first storage device to the secondary logical volume of the third storage device via the virtual logical volume of the second storage device.

8. The remote copy recovery method according to claim 7, wherein, in the step of managing an address location of each of one or more data, each of the first storage device, the second storage device, and the third storage device manages the address location of each of one or more data by using a bitmap.

9. The remote copy recovery method according to claim 7, wherein, in the step of managing an address location of each of one or more data, the address location managed by the first storage device and an aggregated address location between the second storage device and the third storage device are aggregated in the first storage device after a plurality of address locations managed by the second storage device and the third storage device are aggregated in the second storage device.

10. A storage system comprising:
a first storage system having a first logical volume associated with storage area in a plurality of first drives in the first storage system;
a second storage system having a virtual volume not associated with storage area in a plurality of second drives in the second storage system, the virtual volume configuring a first copy pair with the first logical volume in the first storage system;
a third storage system having a second logical volume associated with storage area in a plurality of second drives in the third storage system, the second logical volume configuring a second copy pair with the virtual volume in the second storage system,
wherein, if the first storage system receives a write data to the first logical volume, the first storage system stores the write data in at least one of first drives and sends the write data to the virtual volume in the second storage system,
wherein, if the second storage system receives the write data from the first storage system, the second storage system transfers the write data to the second logical volume in the third storage system,
wherein, if the third storage system receives the write data transferred from the second storage system, the third storage system stores the write data in at least one of the third drives,
wherein if the second storage system detects a failure on a path between the second storage system and the third storage system, the second storage system sends notification of the failure on the path to the first storage system, and
wherein if the first storage device receives the notification from the second storage device, the first storage system stops sending the write data to the second storage system.

11. A storage system according to claim 1,
wherein the first copy pair is a synchronous remote copy pair,
wherein the first storage system sends the write data to the virtual volume in the second storage system according to a synchronous remote copy procedure.

12. A storage system according to claim 10,
wherein the second copy pair is an asynchronous remote copy pair,
wherein the second storage system transfers the write data to the second logical volume in the third storage system according to an asynchronous remote copy procedure.

13. A storage system according to claim 10, wherein the second storage system further has a journal volume associated with the plurality of the second drives, and stores a journal data including the write data and update information.

14. A storage system comprising:
a first storage system having a first logical volume associated with storage area in a plurality of first drives in the first storage system;
a second storage system having a virtual volume which does not consume storage area in a plurality of second drives in the second storage system, the virtual volume configuring a synchronous copy pair with the first logical volume in the first storage system;
a third storage system having a second logical volume associated with storage area in a plurality of second drives in the third storage system, the second logical volume configuring an asynchronous copy pair with the virtual volume in the second storage system,
wherein if a failure occurs on a path between the second storage system and the third storage system, the first storage system stops data transfer of a write data to be stored in the first logical volume to the virtual volume in the second storage system.

15. A storage system according to claim 14,
wherein, if the first storage system receives the write data to the first logical volume, the first storage system stores the write data in at least one of first drives and sends the write data to the virtual volume in the second storage system according to a synchronous remote copy procedure,
wherein, if the second storage system receives the write data from the first storage system, the second storage system transfers the write data to the second logical volume in the third storage system according to an asynchronous remote copy procedure,
wherein, if the third storage system receives the write data transferred from the second storage system, the third storage system stores the write data in at least one of the third drives.

16. A storage system according to claim 14, wherein if a failure occurs on a path between the second storage system and the third storage system, the second storage system sends notification of the failure to the first storage system, and the first storage system stops the data transfer by receiving the notification from the second storage system.

17. A storage system according to claim 14, wherein the second storage system further has a journal volume associated with the plurality of the second drives, and stores a journal data including the write data and update information.

* * * * *